United States Patent
Mok et al.

(10) Patent No.: US 10,159,021 B2
(45) Date of Patent: Dec. 18, 2018

(54) HANDOVER METHOD AND APPARATUS IN A WIRELESS COMMUNICATION SYSTEM

(71) Applicant: Samsung Electronics Co., Ltd, Gyeonggi-do (KR)

(72) Inventors: Youngjoong Mok, Gyeonggi-do (KR); Hyun Jeong Kang, Seoul (KR); Sangwook Kwon, Gyeonggi-do (KR); Kyungkyu Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 15/339,817

(22) Filed: Oct. 31, 2016

(65) Prior Publication Data

US 2017/0127320 A1     May 4, 2017

(30) Foreign Application Priority Data

Oct. 30, 2015     (KR) .......................... 10-2015-0152436

(51) Int. Cl.
*H04W 36/00* (2009.01)
*H04W 72/04* (2009.01)
(Continued)

(52) U.S. Cl.
CPC ... *H04W 36/0072* (2013.01); *H04W 36/0077* (2013.01); *H04W 36/0094* (2013.01);
(Continued)

(58) Field of Classification Search
CPC ............. H04W 72/04; H04W 36/0016; H04W 36/0072; H04W 36/32; H04W 72/0426;
(Continued)

(56) References Cited

U.S. PATENT DOCUMENTS

| 2010/0067484 A1* | 3/2010 | Kagimoto | ............... H04W 4/20 370/331 |
| 2011/0051685 A1* | 3/2011 | Saitou | ................... H04W 36/02 370/331 |

(Continued)

OTHER PUBLICATIONS

Huawei, et al., "Improvement of Network Capabilities to Support Vehicular Case", 3GPP TSG-SA WG1 Meeting #71, S1-152734, Belgrade, Serbia, Aug. 17-21, 2015, 4 pages.

*Primary Examiner* — Michael Thier
*Assistant Examiner* — Rownak Islam

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present disclosure provides an operating method and apparatus for supporting a handover to support a high reliability and low latency service in a wireless communication system. The method of operating the terminal includes receiving data from a service via a first base station (BS), transmitting, to the first BS, a bearer establishment command message between the first BS and a second BS determined by movement information of the terminal, and receiving, from the second BS, data transmitted from the second BS via the established bearer between the first BS and the second BS.

17 Claims, 30 Drawing Sheets

(51) Int. Cl.
*H04W 36/32* (2009.01)
*H04L 29/08* (2006.01)
*H04W 92/20* (2009.01)

(52) U.S. Cl.
CPC ....... *H04W 36/32* (2013.01); *H04W 72/0426* (2013.01); *H04L 67/12* (2013.01); *H04W 36/00* (2013.01); *H04W 92/20* (2013.01)

(58) Field of Classification Search
CPC ............ H04W 36/00; H04W 36/0094; H04W 36/0077; H04L 67/12
USPC ................................................. 370/332, 331
See application file for complete search history.

(56) References Cited

U.S. PATENT DOCUMENTS

| | | | | |
|---|---|---|---|---|
| 2012/0044907 | A1* | 2/2012 | Mildh | H04W 36/0072 370/331 |
| 2012/0115541 | A1* | 5/2012 | Suga | H04W 36/22 455/525 |
| 2012/0258715 | A1* | 10/2012 | Souissi | H04W 36/14 455/436 |
| 2015/0120183 | A1 | 4/2015 | Annapureddy et al. | |
| 2015/0172963 | A1* | 6/2015 | Kim | H04W 36/0027 370/332 |

* cited by examiner

| Pre-Path zone ID | Central location | Handover zone |
|---|---|---|
| Pre-Path zone A | XX.XX.XX | Handover zone A<br>Handover zone B |
| .... | .... | |
| .... | .... | |
| .... | .... | |

FIG.11A

| Pre-Path zone ID | BS ID |
|---|---|
| Pre-Path zone A | BS ID A<br>BS ID B<br>BS ID C |
| .... | .... |
| .... | .... |
| .... | .... |

FIG.11B

| Handover zone ID | Central location |
|---|---|
| Handover zone A | Grid A : x,y |
| | Grid B : x,y |
| | Grid C : x,y |
| .... | .... |
| .... | .... |
| .... | .... |

FIG.11C

| Handover zone ID | BS ID |
|---|---|
| Handover zone A | BS ID A |
| . . . . | . . . . |
| . . . . | . . . . |
| . . . . | . . . . |

FIG.11D

HANDOVER METHOD AND APPARATUS IN A WIRELESS COMMUNICATION SYSTEM

CROSS-REFERENCE TO RELATED APPLICATION AND CLAIM OF PRIORITY

The present application is related to and claims the benefit under 35 U.S.C. § 119(a) of a Korean patent application filed in the Korean Intellectual Property Office on Oct. 30, 2015 and assigned Serial No. 10-2015-0152436, the entire disclosure of which is hereby incorporated by reference.

TECHNICAL FIELD

The present disclosure relates to a wireless communication system, and more particularly, to a wireless communication system for providing a vehicle service.

BACKGROUND

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Recently, a wireless communication system is evolved to provide users with various services. For example, the wireless communication system uses a wireless communication technique to provide a vehicle service between a vehicle and another vehicle, between the vehicle and an infrastructure, between the vehicle and a pedestrian, between the vehicle and a driver, between the vehicle and a passenger, or the like. The vehicle service requires periodic transmission, low latency transmission, and high reliability transmission of vehicle service information.

SUMMARY

To address the above-discussed deficiencies, it is a primary object to provide a method and apparatus for supporting a handover for a high reliability and low latency service in a wireless communication system.

An exemplary embodiment of the present disclosure may provide a method of operating a terminal for supporting a handover. The method of operating the terminal includes receiving data from a service via a first Base Station (BS), transmitting, to the first BS, a bearer establishment command message between the first BS and a second BS related to movement information of the terminal, and receiving, from the second BS, data transmitted from the second BS via the established bearer between the first BS and the second BS.

An exemplary embodiment of the present disclosure may provide a method of operating a first BS. The method of operating the first BS includes transmitting, to a terminal, data received from a server, receiving, from the terminal, a bearer establishment command message with respect to a second BS related to movement information of the terminal, establishing a bearer with respect to the second BS on the basis of the received bearer establishment command message, and transmitting, to the second BS, the data received from the server on the basis of the established bearer.

An exemplary embodiment of the present disclosure may provide a method of operating a second BS. The method of operating the second BS includes receiving a bearer establishment request message from a first BS, establishing a bearer with respect to the first BS on the basis of the bearer establishment request message, receiving data from the first BS via the established bearer, and transmitting the received data to a terminal.

An exemplary embodiment of the present disclosure may provide a method of operating a server. The method of operating the server includes transmitting data to a terminal via a first BS, receiving a bearer establishment command message from the terminal via the first BS, establishing a bearer with respect to a second BS related to movement information of the terminal on the basis of the bearer establishment command message, and transmitting data to the second BS on the basis of the established bearer.

An exemplary embodiment of the present disclosure may provide a terminal device. The terminal device includes a transceiver, and a controller operatively coupled to the transceiver. The controller is configured for receiving data from a service via a first BS, transmitting, to the first BS, a bearer establishment command message between the first BS and a second BS related to movement information of the terminal, and receiving, from the second BS, data transmitted from the second BS via the established bearer.

An exemplary embodiment of the present disclosure may provide a first BS device. The first BS device includes a transceiver, and a controller operatively coupled to the transceiver. The controller is configured for transmitting, to a terminal, data received from a server, receiving, from the terminal, a bearer establishment command message with respect to a second BS related to movement information of the terminal, establishing a bearer with respect to the second BS on the basis of the received bearer establishment command message, and transmitting, to the second BS, the data received from the server on the basis of the established bearer.

An exemplary embodiment of the present disclosure may provide a second BS device. The second BS device includes a transceiver, and a controller operatively coupled to the transceiver. The controller is configured for receiving a bearer establishment request message from a first BS, establishing a bearer with respect to the first BS on the basis of the bearer establishment request message, receiving data from the first BS via the established bearer, and transmitting the received data to a terminal.

An exemplary embodiment of the present disclosure may provide a server device. The server device includes a communication unit, and a controller operatively coupled to the communication unit. The controller is configured for transmitting data to a terminal via a first BS, receiving a bearer establishment command message from the terminal, establishing a bearer with respect to a second BS related to movement information of the terminal on the basis of the bearer establishment command message, and transmitting data to the second BS on the basis of the established bearer.

Various exemplary embodiments of the present specification provide a method capable of increasing user satisfaction by providing a low latency and high reliability service to a moving vehicular terminal or a terminal placed in a vehicle in a wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11A to FIG. 11D illustrate information indicating a pre-path region and a handover region according to various embodiments of the present disclosure.

DETAILED DESCRIPTION

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Various embodiments used hereinafter to describe FIG. 1 to FIG. 21 and principles of the present disclosure are for purposes only, and thus it should not be interpreted as being intended for limiting a scope of the present disclosure. Those ordinarily skilled in the art may understand that the principles of the present disclosure can be implemented in other devices or systems properly arranged.

Exemplary embodiments of the present disclosure described hereinafter relate to a method for supporting a service which requires low latency transmission and high reliability transmission to a moving vehicular terminal (i.e., a User Equipment (UE)) or a terminal placed in a vehicle in a wireless communication system for providing a vehicle service, for example, a vehicle-to-device or vehicle-to-infrastructure vehicle communication system, i.e., a Vehicle to Everything (V2X) communication system. The wireless communication system supports a vehicle-to-device direct communication supporting a vehicle service between a vehicle and another vehicle, between the vehicle and an infrastructure, between the vehicle and a pedestrian, between the vehicle and a driver, between the vehicle and a passenger, or the like, or supports communication via a cellular Base Station (BS). The vehicle service includes a safety service such as an accident occurrence notification, a prior warning of rear-end collision, an emergency vehicle notification, or the like, a vehicle information service such as a parking facility notification, a navigation, a vehicle diagnosis, or the like, and a traffic information service such as a lane change notification, a road usage change notification, a regulated speed notification, or the like. The vehicle service requires periodic transmission, low latency transmission, and high reliability transmission of vehicle service information. Exemplary embodiments of the present disclosure provide a method and apparatus for supporting a handover for a high reliability and low latency service in a wireless communication system.

Figure 1:
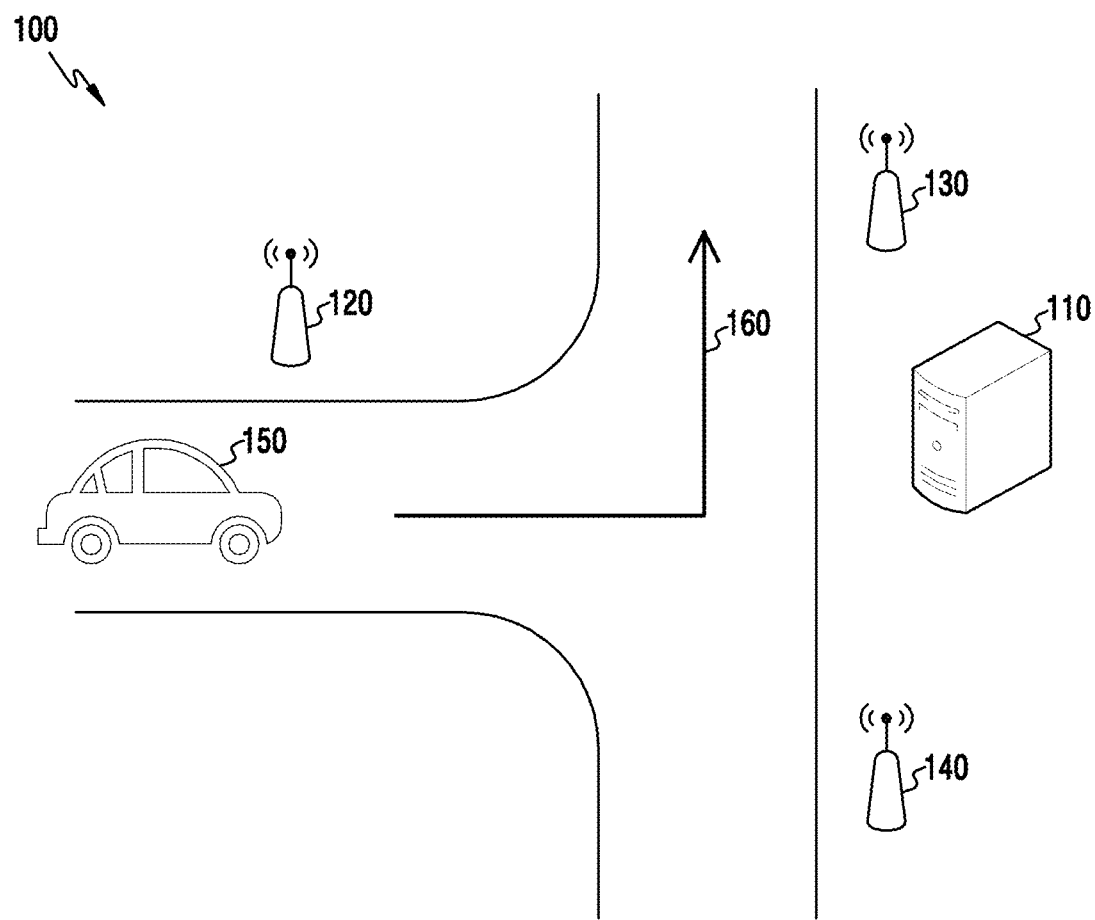
FIG. 1 illustrates an example of a wireless communication system for providing a vehicle service.

FIG. 1 illustrates an example of a wireless communication system 100 for providing a vehicle service.

Referring to FIG. 1, the wireless communication system 100 includes a network 110, a BS 120, a BS 130, and a BS 140, and a moving terminal 150. An example of the network 110 includes an Evolved Packet Core (EPC).

The network 110 can include a Mobility Management Entity (MME), a Serving Gateway (S-GW), and a Packet Data Network Gateway (P-GW). The MME has access information of the moving terminal 150 or information regarding capability of the moving terminal 150, and the information is used for mobility management of the moving terminal 150. The S-GW is used to support a handover executed between the moving terminal 150 and the BSs 120, 130, and 140. The P-GW allocates an Internet Protocol (IP) address to the moving terminal 150. Further, the P-GW is used to support the S-PW used for the handover executed between the moving terminal 150 and the BSs 120, 130 and 140.

The network 110 can provide the vehicle service to the moving terminal 150 via the BSs 120, 130, and 140. In one embodiment, the network 110 can provide the vehicle service to the moving terminal 150 via the BS 120 existing on a movement path of the moving terminal 150. The moving terminal 150 can execute a handover to the BS 130 or the BS 140 along with the movement path. When the handover is complete, the moving terminal 150 can receive the vehicle service provided from the network 110 via the BS 130 or the BS 140.

The BS 120 can determine to which BS the moving terminal 150 will execute the handover between the BS 130 and the BS 140. In one embodiment, when the moving terminal 150 moves along with a movement path 160, the BS 120 can determine that the moving terminal 150 will execute the handover to the BS 130.

Figure 2A:
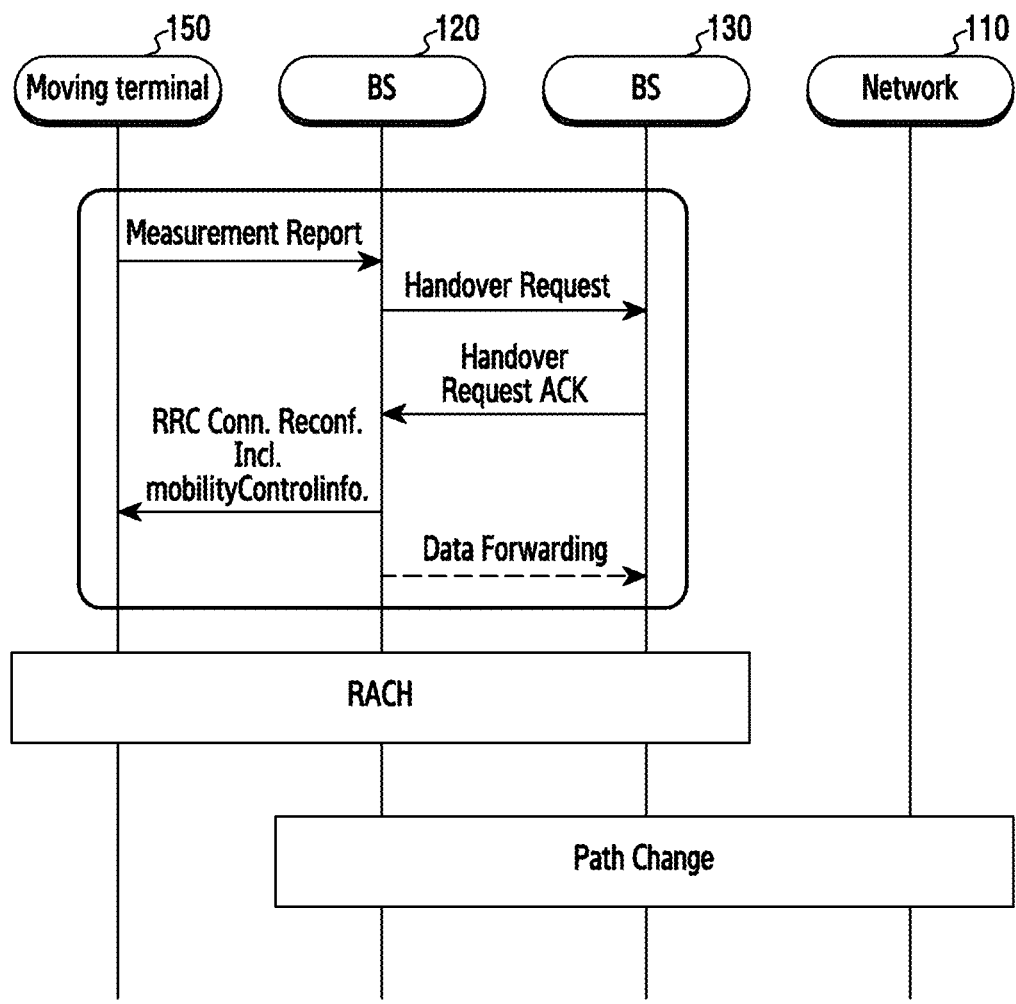
FIG. 2A illustrates a typical handover handling procedure in a wireless communication system.

FIG. 2A illustrates a typical handover handling procedure in the wireless communication system 100.

Referring to FIG. 2A, the moving terminal 150 transmits a measurement report message to the BS 120 existing on the movement path. The measurement report message can include measurement result for strength of signals (i.e. Reference Signal Received Power (RSRP), Reference Signal Received Quality (RSRQ)) between the moving terminal 150 and the BSs 120, 130, and 140. The BS 120 can determine a handover between the moving terminal 150 and the BS 130 on the basis of the measurement result included in the measurement report message.

When it is determined to execute the handover, the BS 120 transmits a handover request message to the BS 130. The BS 130 transmits a handover request ACKnowledgement (ACK) message to the BS 120 in response to the handover request message. The handover request ACK message can include a random access preamble and a Radio Network Temporary Identifier (RNTI) which are required by the moving terminal 150 to execute the handover to the BS 130.

Upon receiving the handover request ACK message, the BS 120 transmits an RRC Connection Reconfiguration (RRC Conn.Reconf) message to the moving terminal 150. The RRC Conn.Reconf message can include information regarding the BS 130 and mobility control information (mobilityControlInfo) of the moving terminal 150. Radio Resource Control (RRC) is used to control a radio resource between the terminal and the BS.

The BS 120 can perform data forwarding to the BS 130. In one embodiment, in case of being connected via an X2 interface between the BS 120 and the BS 130, the BS 120 can directly perform data forwarding to the BS 130. In another embodiment, in case of being connected via an S1 interface between the BS 120 and the BS 130, the BS 120 can perform data forwarding to the BS 130 via the network 110.

The moving terminal 150 executes a handover by transmitting the random access preamble message to the BS 130. The BS 130 transmits a random access ACK message to the moving terminal 150 in response to the random access preamble message. When the execution of the handover is complete, the moving terminal 150 can receive the vehicle service from the BS 130 through a Random Access CHannel (RACH).

Figure 2B:
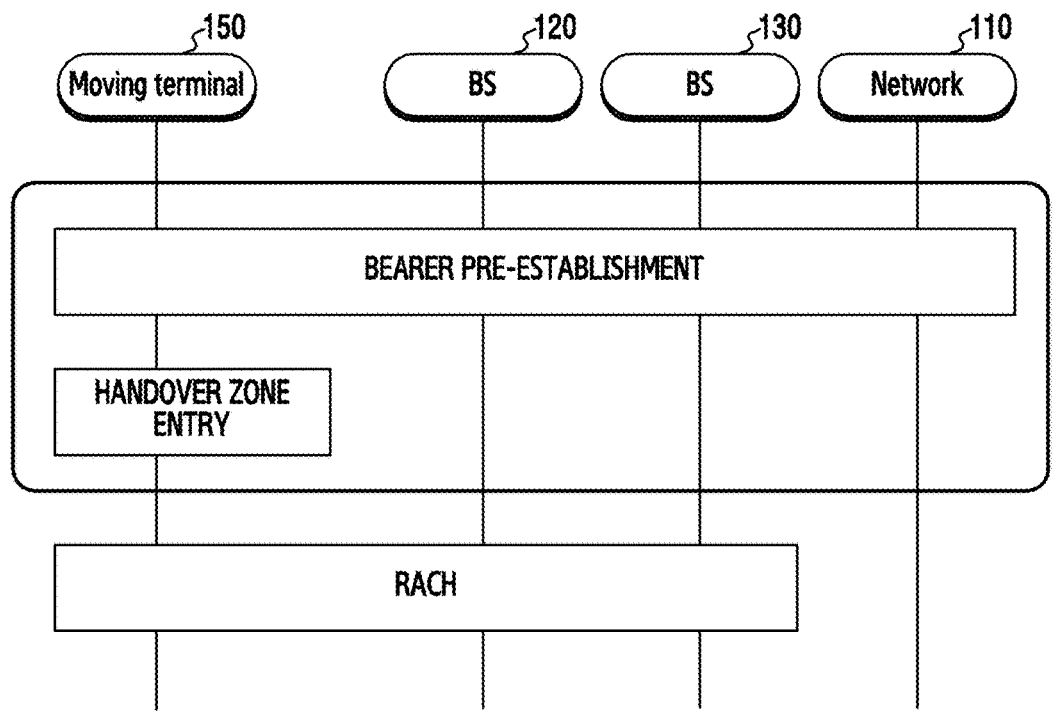
FIG. 2B illustrates a brief handover handling procedure according to various exemplary embodiments of the present disclosure.

FIG. 2B illustrates a brief handover handling procedure according to various embodiments of the present disclosure.

Referring to FIG. 2B, the BS 120 can establish a bearer with respect to the BS 130 before the handover is executed. When it is determined to execute the handover, the moving terminal 150 can receive the aforementioned vehicle service through an RACH from the BS 130 without the handover execution procedure according to the conventional technique.

Figure 3:
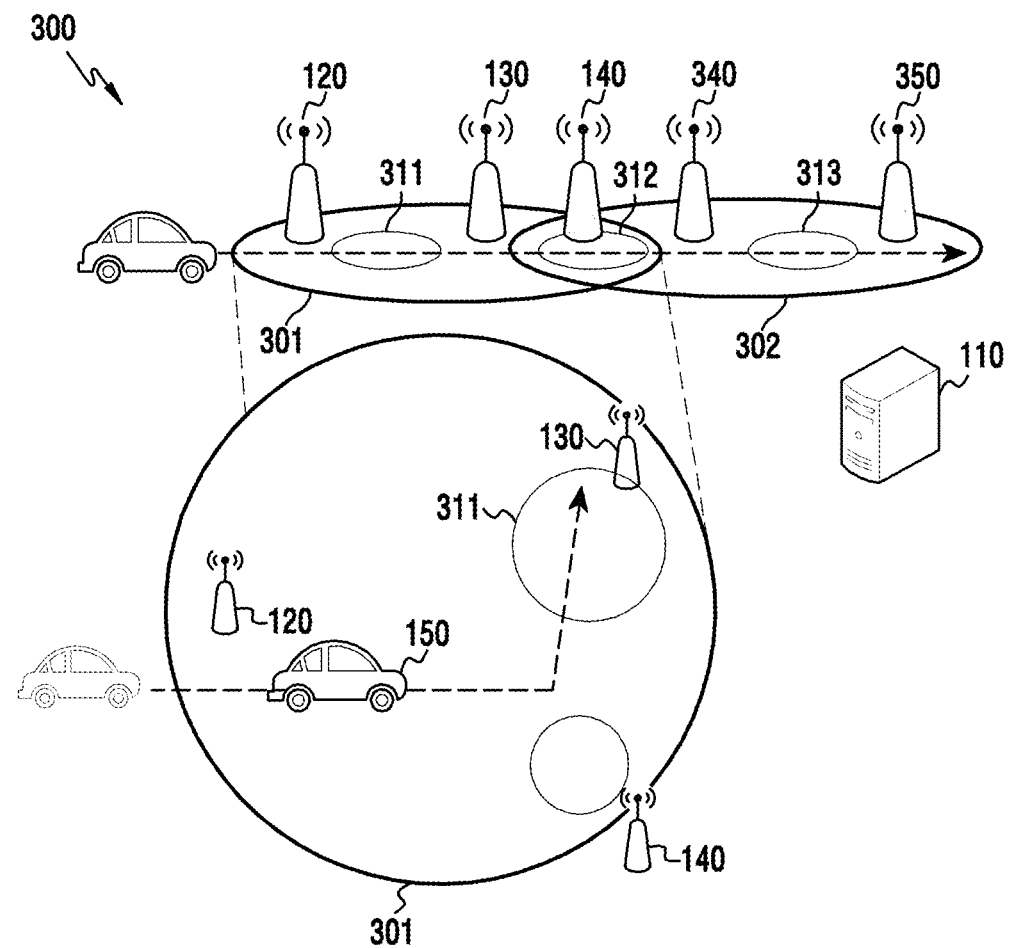
FIG. 3 is a drawing for explaining the concept of a handover handling operation in a wireless communication system according to various exemplary embodiments of the present disclosure.

FIG. 3 is a drawing for explaining the concept of a handover handling operation in a wireless communication system 300 according to various embodiments of the present disclosure.

An embodiment of the wireless communication system 300 of FIG. 3 is for descriptive purposes only. Other embodiments of the wireless communication system 300 can also be used without departing from the scope of the present disclosure.

Referring to FIG. 3, in addition to the wireless communication system 100 of FIG. 1, the wireless communication system 300 further includes a pre-path region 301, a pre-path region 302, a handover region 311, a handover region 312, and a handover region 313.

The pre-path region 301 and the pre-path region 302 can include at least two BSs related to mobility information of the moving terminal 150. In one embodiment, according to the mobility information of the terminal, the pre-path region 301 can include the BS 120, the BS 130, and the BS 140. Although the pre-path region 301 including the BS 120, the BS 130, and the BS 140 is illustrated in FIG. 3, a size of the pre-path region 301, the number of included BSs, and whether the BS is included in an overlapping manner with another pre-path region are not limited. For example, the pre-path region 301 can include all of the BS 120, the BS 130, a BS 340, and a BS 350. The sizes of the pre-path region 301 and the pre-path region 302, the number of included BSs, and whether the BS is included in an overlapping manner with another pre-path region can be determined by the network 110 on the basis of the mobility information of the moving terminal 150.

The handover region 311, the handover region 312, and the handover region 313 are sub-regions of the pre-path region 301 and the pre-path region 302. A size of a handover region included in one pre-path region, the number of handover regions, and whether two or more pre-path regions include one handover region in an overlapping manner are not limited. In one embodiment, as shown in FIG. 3, the handover region 312 can be included in both of the pre-path region 301 and the pre-path region 302. The size of the handover region included in one pre-path region, the number of handover regions, and whether two or more pre-path regions include one handover region in an overlapping manner can be determined by the network 110 on the basis of the mobility information of the moving terminal 150.

According to one embodiment of the present disclosure of FIG. 3, when the moving terminal 150 enters the pre-path region 301, a bearer is established among the BSs 120, 130, and 140 included in the pre-path region 301. The BS 120 can perform data forwarding to the BS 120 or the BS 130 to execute the handover on the basis of the established bearer.

According to one embodiment of the present disclosure of FIG. 3, when the moving terminal 150 enters the handover region 311, the moving terminal 150 can execute an RACH operation with respect to the BS 130. When the execution of the RACH operation is complete, the moving terminal 150 can receive a vehicle service from the network 110 via the BS 130.

Although the aforementioned method provides only an operation for executing the handover of the moving terminal 150 with respect to the BS 120 and the BS 130, a bearer can be established among different BSs according to a movement path of the moving terminal 150, and the moving terminal 150 can execute the handover with respect to the different BSs. For example, when the moving terminal 150 enters the pre-path region 302, the BSs 340 and 350 included in the pre-path region 302 can establish the bearer. When the moving terminal 150 enters the handover region 312, the moving terminal 150 can perform the RACH operation with respect to the BS 340. When the terminal enters the handover region 313, the moving terminal 150 can perform the RACH operation with respect to the BS 350.

Figure 4:
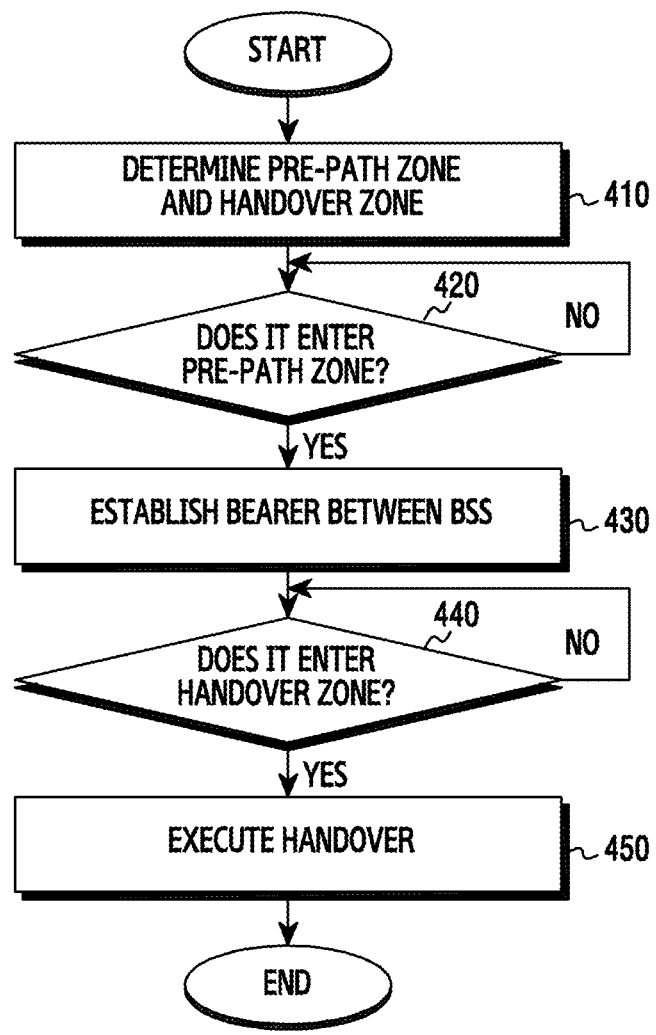
FIG. 4 is a flowchart illustrating a handover operation according to various exemplary embodiments of the present disclosure.

FIG. 4 is a flowchart illustrating a handover operation according to various embodiments of the present disclosure.

Referring to FIG. 4, in step 410, the network 110 determines a pre-path region and a handover region on the basis of movement information of the moving terminal 150. The movement information of the moving terminal 150 is transmitted from the moving terminal 150 via the BS 120 (or different BSs communicating with a different terminal). Information indicating the determined pre-path region and handover region is transmitted from a server to the moving terminal 150 via the BS 120. Further, the information indicating the determined pre-path region and handover region can be transmitted to BSs included in the pre-path region. In one embodiment, the network 110 can determine the pre-path region 301 and the handover region 311 on the basis of the movement information of the moving terminal 150.

In step 420, the moving terminal 150 can determine whether it enters the pre-path region determined by the server on the basis of the received information. When it enters the pre-path region, the moving terminal 150 can transmit a pre-path command message among BSs included in the pre-path region. In one embodiment, if the moving terminal 150 enters the pre-path region 310, the moving terminal 150 can transmit to the BS 120 the pre-path command message among the BSs included in the pre-path region 301.

In step 430, the BSs included in the pre-path region establishes a bearer. In one embodiment, the BSs 120, 130, and 140 included in the pre-path region 301 can establish the bearer. The bearer establishment can be performed through an X2 interface or an S2 interface.

In step 440, the moving terminal 150 or the BSs included in the pre-path region can determine whether the moving terminal 150 enters the determined handover region. When the moving terminal 150 enters the determined handover region, the moving terminal 150 can execute a handover with respect to the BS included in the determined pre-path region (step 450). In one embodiment, the moving terminal 150 can execute a handover with respect to the BS 130 when entering the handover region 311 which is a sub-region of the pre-path region 301.

Figure 5:
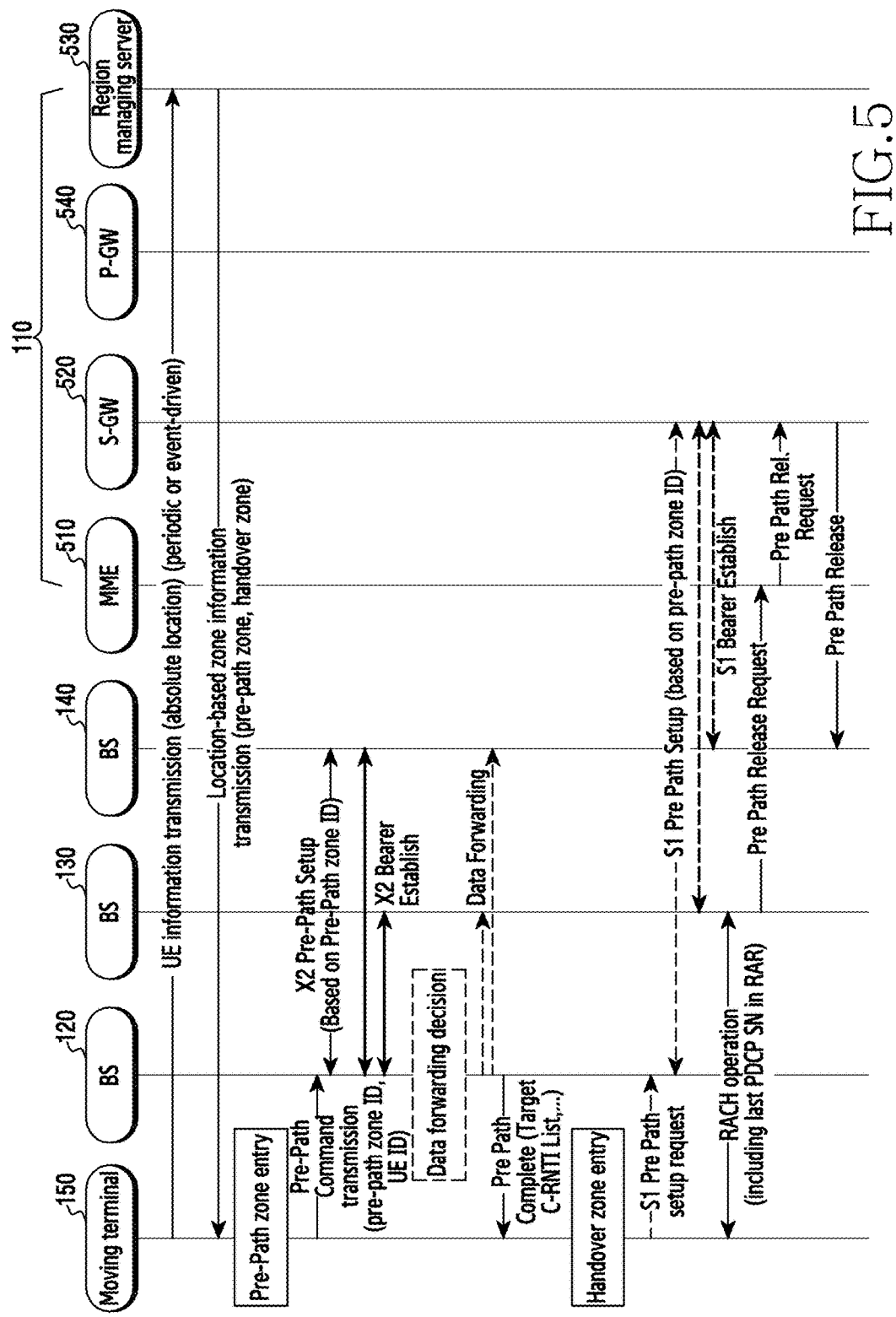
FIG. 5 illustrates a handover handling procedure in detail according to various exemplary embodiments of the present disclosure.

FIG. 5 illustrates a handover handling procedure in detail according to various embodiments of the present disclosure.

Referring to FIG. 5, the network 110 can include an MME 510, an S-GW 520, a P-GW 540, and a region managing server 530. According to one embodiment of the present disclosure, the BS 120, the BS 130, and the BS 140 are included in the pre-path region 301. The pre-path region 301 can include the handover region 311. Although it is illustrated in FIG. 5 that the moving terminal 150 executes a handover with respect to the BS 120, the BS 130, and the BS 140, according to one embodiment of the present disclosure, the moving terminal 150 can execute the handover with respect to BSs included in a different pre-path region related to movement information.

The moving terminal 150 can transmit the movement information of the moving terminal 150 to the region managing server 530. Although it is illustrated in FIG. 5 that the moving terminal 150 transmits the movement information to the region managing server 530, the movement information can be transmitted to the region managing server 530 via a BS communicating with the moving terminal 150. In one embodiment, the movement information can be transmitted periodically. As another embodiment, the movement information can be transmitted by the moving terminal 150 when an event occurs. For example, the moving terminal 150 can transmit the information to the region managing server 530 when an accident occurs.

The region managing server 530 can determine a pre-path region and handover region related to a movement path of the moving terminal 150 on the basis of the received movement information. Information indicating the determined pre-path region and handover region can be transmitted from the region managing server 530 to the moving terminal 150. Further, the information indicating the determined pre-path region and handover region can be transmitted from a server to BSs included in the determined pre-path region. In one embodiment, the network 110 can transmit information indicating the pre-path region 301 and the handover region 311 to the BSs 120, 130, and 140 included in the pre-path region 301.

When the moving terminal 150 enters the determined pre-path region, the moving terminal 150 can transmit a pre-path command message to the BS included in the pre-path region. The pre-path command message can be a pre-path command message for an X2 interface or an S1 interface.

Upon receiving the pre-path command message, the BS 120 can perform a bearer establishment operation with respect to the BSs 130 and 140 included in the pre-path region 301. The BS 120 can execute an X2 pre-path setup with respect to the BS 130 and the BS 140. Further, the BS 120 can execute an S1 pre-path setup with respect to the BS 130 and the BS 140. When the execution of the pre-path setup is complete, a bearer can be established among the BS 120, the BS 130, and the BS 140. The BS 120 can execute data forwarding to the BS 130 or the BS 140 via the established bearer. The BS 120 can transmit a pre-path complete message to the moving terminal 150. The pre-path complete message can include a target C-Radio Network Temporary Identifier (RNTI) list. When entering the handover region 311, the moving terminal 150 can execute an RACH operation with respect to the BS 130.

Figure 6:
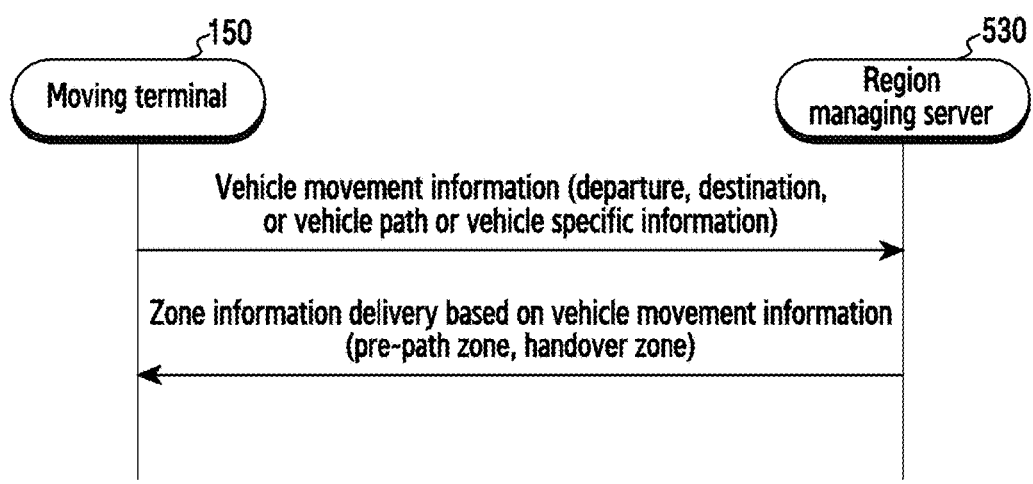
FIG. 6 illustrates an operation of exchanging information between a terminal and a region managing server according to an exemplary embodiment of the present disclosure.

FIG. 6 illustrates an operation of exchanging information between the moving terminal 150 and the region managing server 530 according to an embodiment of the present disclosure.

Although it is illustrated in FIG. 6 that information is directly delivered between the moving terminal 150 and the region managing server 530, both of the moving terminal 150 and the region managing server 530 can transmit the information via a BS communicating with the moving terminal 150.

The moving terminal 150 can transmit vehicle movement information of the moving terminal 150 to the region managing server 530. In one embodiment, the vehicle movement information can include a destination address and departure address of the moving terminal 150 or both of the departure address and the destination address. In another embodiment, the vehicle movement information can correspond to a vehicle number (e.g., a city bus number, a vehicle specific number). In another embodiment, if the moving terminal 150 is operatively coupled to a navigation, the vehicle movement information can correspond to a vehicle path indicated by the navigation.

The region managing server 530 can determine the movement path of the moving terminal 150 on the basis of the received vehicle movement information, and can determine a list of BSs located on the movement path. The region managing server 530 can determine the pre-path region and the handover region on the basis of the vehicle movement information and the BS list. The region managing server 530 can transmit information indicating the determined pre-path region and handover region to the moving terminal 150.

Figure 7:
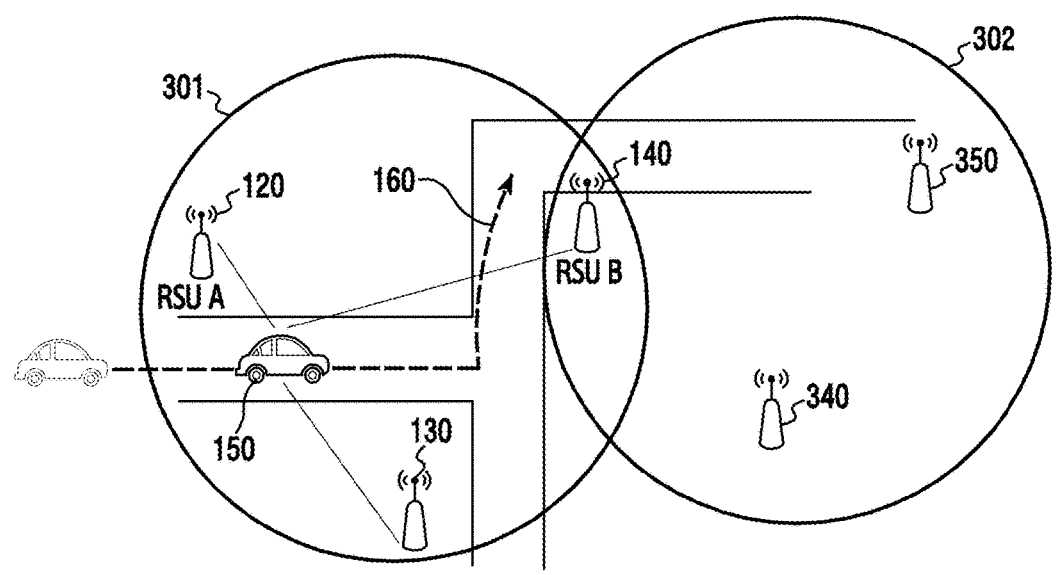
FIG. 7 illustrates an operation of determining a pre-path region according to various embodiments of the present disclosure.

FIG. 7 illustrates an operation of determining a pre-path region according to various embodiments of the present disclosure.

Referring to FIG. 7, the wireless communication system 300 can include the pre-path region 301 and the pre-path region 302. The pre-path region can include a list of BSs located on a movement path of the moving terminal 150 and determined by the network 110 on the basis of movement information of the moving terminal 150. The pre-path region 301 can include the BS 120, the BS 130, and the BS 140. The pre-path region 302 can include the BS 140, the BS 340, and the BS 350. Although the limited size of the pre-path region and the limited number of BSs are shown in FIG. 7 for convenience of explanation, the size of the pre-path region and the number of BSs are not limited. In one embodiment, the pre-path region 301 can further include the BS 340 and the BS 350 according to a wireless communication environment between BSs. In another embodiment, the pre-path region 301 can include only the BS 120 and the BS 130.

Figure 8A:
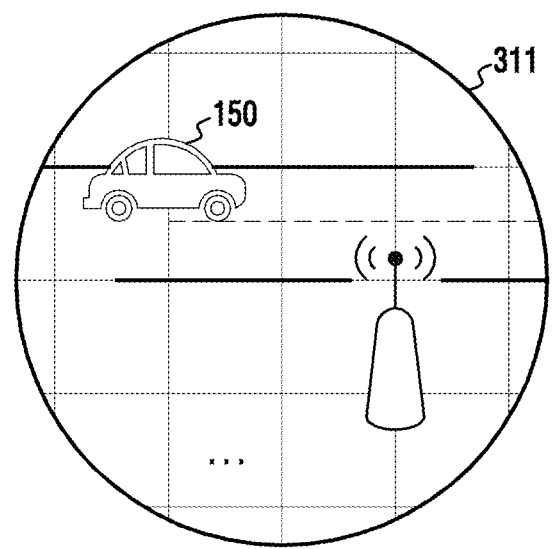
FIG. 8A and FIG. 8B illustrate an operation of determining a handover region according to various embodiments of the present disclosure.
Figure 8B:
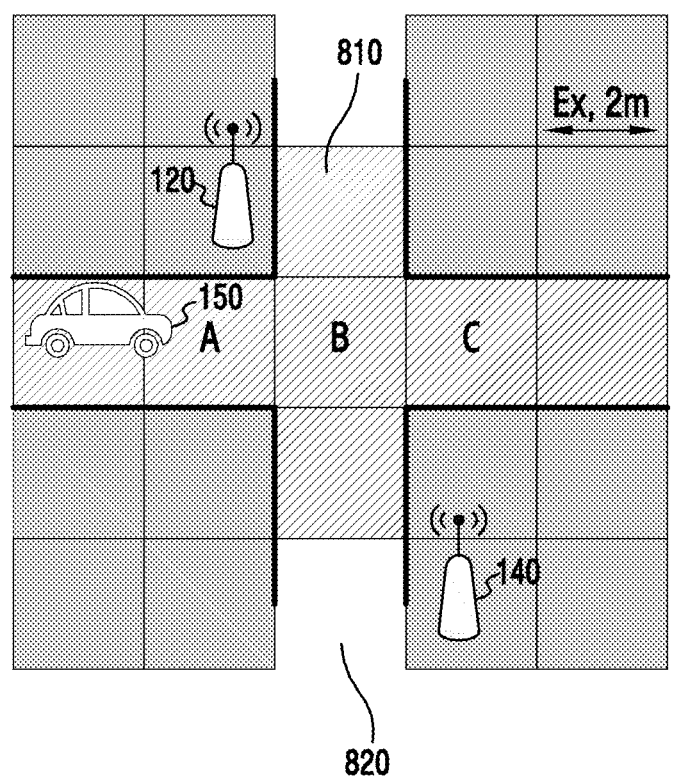

FIG. 8A and FIG. 8B illustrate an operation of determining a handover region according to various embodiments of the present disclosure.

Referring to FIG. 8A, when the moving terminal 150 enters the handover region 311, the moving terminal 150 can execute a handover operation with respect to the BS 130 without the execution of a Time To Trigger (TTT) operation.

Referring to FIG. 8B, the handover region is pre-set along a street. Whether the street corresponds to the handover region can be measured in a specific unit. For example, as illustrated in FIG. 8B, a road 810 corresponds to a region in which the moving terminal 150 measures signal strength among different BSs to configure the handover region. A road 820 corresponds to a region in which the signal strength has not been measured yet. The street can form a grid with an interval of 2 m. The road 810 can include a grid A, a grid B, and a grid C. The moving terminal 150 can measure signal strength for each of the grids and can transmit the measurement result to the region managing server 530. The region managing server 530 can determine the handover region on the basis of the measurement result on each grid.

Figure 9:
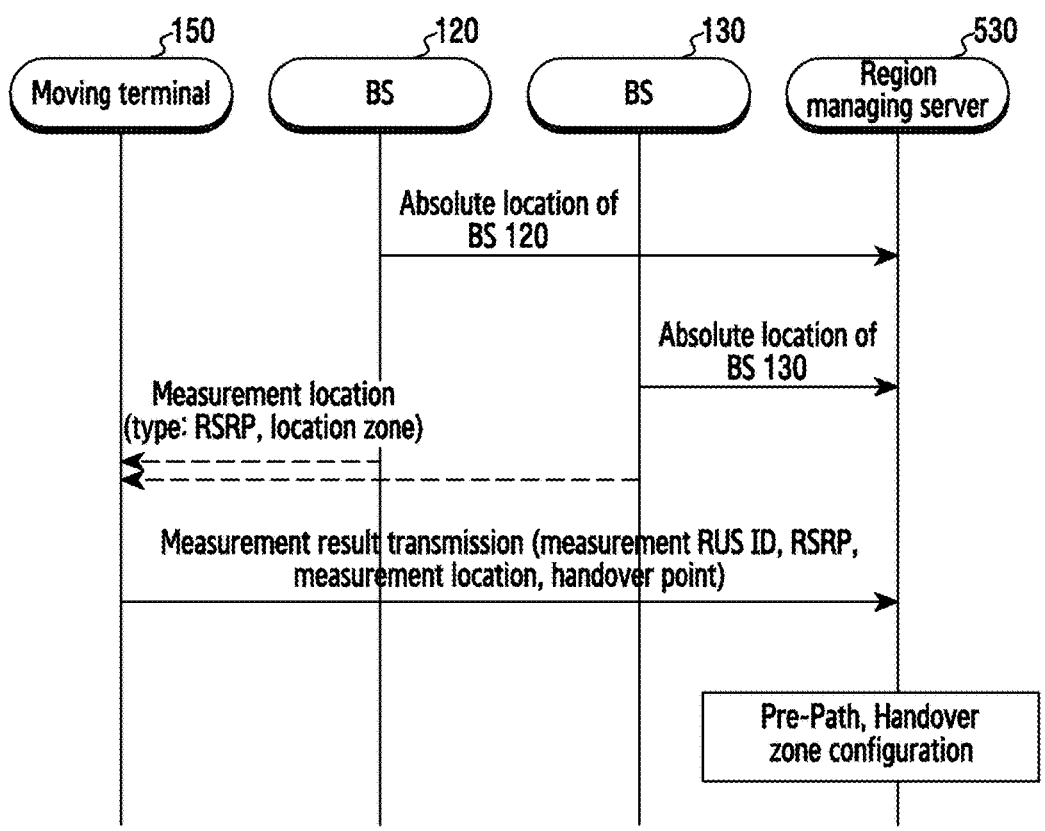
FIG. 9 illustrates a measurement procedure for determining a pre-path region and a handover region according to various embodiments of the present disclosure.

FIG. 9 illustrates a measurement procedure for determining a pre-path region and a handover region according to various embodiments of the present disclosure.

Although only the BS 120 and the BS 130 are illustrated in FIG. 9, the wireless communication system 300 can include different BSs related to the movement information of the moving terminal 150.

Referring to FIG. 9, the BS 120 and the BS 130 can transmit information indicating an absolute location of a fixed BS to the region managing server 530. Further, the BS 120 and the BS 130 can transmit a measurement request message to the moving terminal 150. The measurement request message can include the measurement result for the strength of signals (i.e. RSRP, RSRQ) and measurement location for the BSs 120 and the BS 130 from the moving terminal 150.

The moving terminal 150 can measure the strength of signals and measurement location between the BS 120 and the BS 130, and can transmit information including the measurement result to the region managing server 530. The information including the measurement result can further include an ID of the BS 120 and the BS 130. In addition, the information including the measurement result can further include a handover point. The handover point indicates a point at which the moving terminal 150 executes a handover with respect to the BS 120 and the BS 130.

The region managing server 530 can determine a pre-path region and a handover region related to a movement path of the moving terminal 150 on the basis of absolution location information received from the BS 120 and the BS 130 and the measurement result received from the moving terminal 150.

Figure 10A:
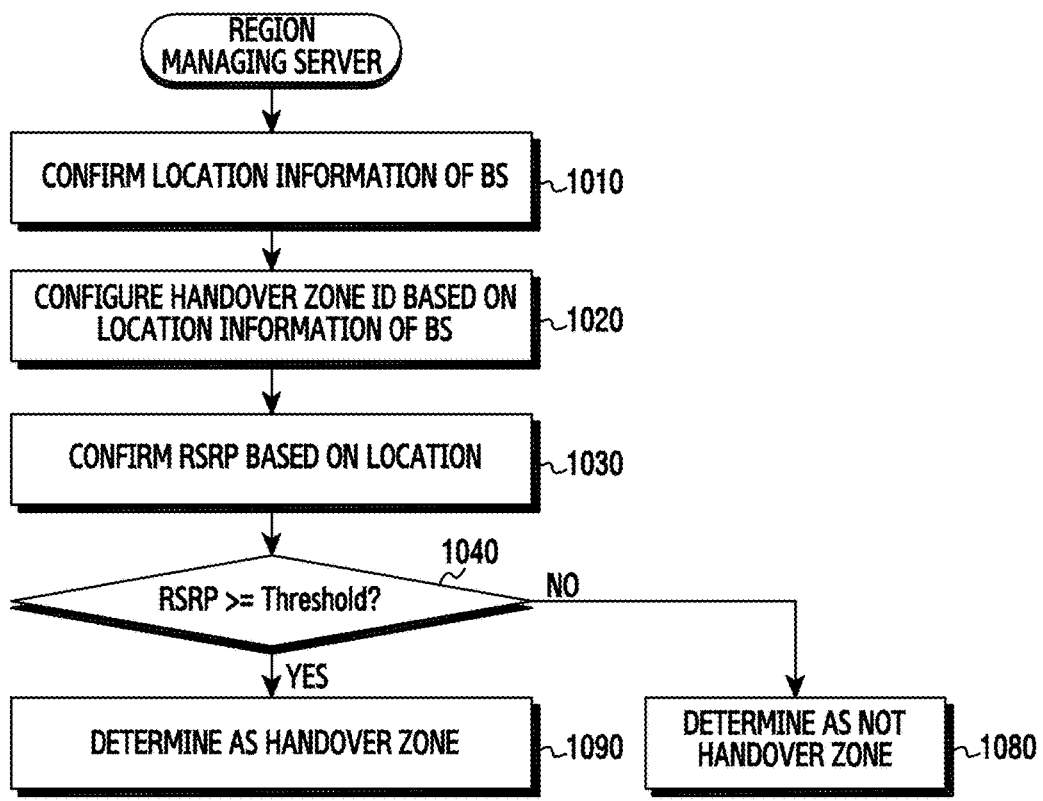
FIG. 10A and FIG. 10B are flowcharts illustrating an operation of determining a handover region according to various embodiments of the present disclosure.
Figure 10B:
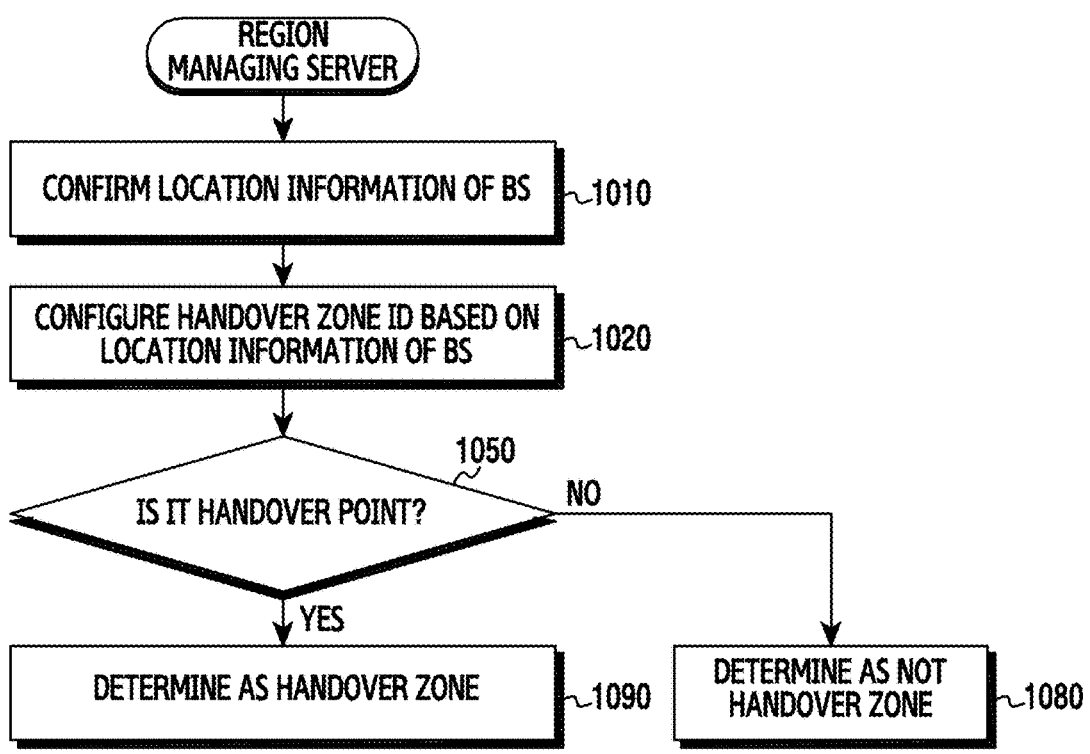

FIG. 10A and FIG. 10B are flowcharts illustrating an operation of determining a handover region according to various embodiments of the present disclosure.

FIG. 10A is a flowchart illustrating a method of determining a handover region on the basis of strength of signals depending on a location of BSs. FIG. 10B is a flowchart illustrating a method of determining a handover region by deciding whether it is a point at which a previous handover occurs according to a location of BSs.

Referring to FIG. 10A, the region managing server 530 can confirm location information of BSs (step 1010). The location information can be expressed by an orthogonal coordinate system. For example, the BS 120 can confirm the location information by using an x-coordinate and a y-coordinate. The region managing server 530 can configure a handover region ID on the basis of the location information of the BSs (step 1020). The handover region ID represents an identifier indicating a region corresponding to the handover region. For example, the handover region ID can be indicated by using the x-coordinate and the y-coordinate. Further, for example, the handover region ID can be indicated by using a grid for forming a road.

The region managing server 530 can confirm strength of signals depending on the location of the BSs (step 1030). The strength of signals can be measured by the moving terminal 150, and the measurement result can be transmitted to the region managing server 530. The region managing server can compare the received measurement value with a threshold value (step 1040) to determine whether it is a handover region. If the received measurement result is greater than or equal to the threshold value, it can be determined as the handover region (step 1090). If the received measurement result is less than the threshold value, it can be determined as not the handover region (step 1080).

In one embodiment, referring to FIG. 8B, the moving terminal 150 can measure the strength of signals with respect to the BS 120 in the grid A, the grid B, and the grid C, and can transmit the measurement result to the region managing server 530. If the measurement result for the strength of signals is greater than the threshold value in the grid A, the region managing server 530 can determine the grid A as the handover region. If the measurement result for the strength of signals is equal to the threshold value in the grid B, the region managing server 530 can determine the grid B as the handover region. If the measurement result for the strength of signals is less than the threshold value in the grid C, the region managing server 530 can determine that the grid C is not the handover region.

Referring to FIG. 10B, the region managing server 530 can confirm location information of BSs (step 1010). The region managing server 530 can configure a handover region ID on the basis of the location information of the BSs (step 1020). The region managing server can determine whether a location of the BSs corresponds to a handover point (step 1050). The handover point can imply a point at which a test vehicle executes a handover while moving along a road. If a random location corresponds to the handover point, the region managing server 530 can determine the location as a handover zone (step 1090). If a different random location does not correspond to the handover point, the region managing server 530 can determine that the location is not the handover zone (step 1080).

In one embodiment, referring to FIG. 8B, the test vehicle can confirm whether the handover is executed while passing the grid A, the grid B, and the grid C. If the handover is executed in the grid A and the grid B, the region managing server 530 can determine that the grid A and the grid B are the handover zone, and can determine that the grid C is not the handover zone.

FIG. 11A to FIG. 11D illustrate information indicating a pre-path region and a handover region according to various embodiments of the present disclosure.

Information indicating the pre-path region and the handover region can be expressed by a mapping table. However, it is expressed by the mapping table only for convenience of explanation, and thus a method of expressing the information is not limited thereto.

FIG. 11A illustrates a mapping table for expressing information regarding a pre-path region and transmitted from the network 110 to the moving terminal 150. The mapping table can include items for a pre-path region ID, a central location, and a handover region. The pre-path region ID represents an identifier indicating a region corresponding to a pre-path region. The central location represents location information of a center of the pre-path region. For example, the central location can be indicated by using an x-coordinate and a y-coordinate. The handover region indicates a sub-region of the pre-path region having the pre-path region ID.

FIG. 11B illustrates a mapping table for expressing information regarding a pre-path region and transmitted from the network 110 to BSs included in a pre-path region. The mapping table can include a pre-path region ID and an ID of the BSs included in the pre-path region. For example, referring to FIG. 3, the pre-path region ID can correspond to the pre-path region 301. The BS ID can correspond to the BSs 120, 130, and 140 included in the pre-path region 301.

FIG. 11C illustrates a mapping table for expressing information regarding a handover region and transmitted from the network 110 to the moving terminal 150. The mapping table can include a handover region ID and a central location. The handover region ID represents an identifier indicating a region corresponding to the handover region. The central location represents central location coordinate information of a grid corresponding to the handover region. For example, referring to FIG. 8B, the central location can be an x-coordinate and a y-coordinate for a central location of a grid A.

FIG. 11D illustrates a mapping table for expressing information regarding a handover region and transmitted from the network 110 to BSs included in a pre-path region. The mapping table can include a handover region ID and a BS ID. The BS ID can include an ID for a BS which executes a handover in a region corresponding to the handover region ID among the BSs included in the pre-path region. For example, referring to FIG. 3, the handover region ID can correspond to the handover region 311, and the BS ID can correspond to the BS 130.

Figure 12A:
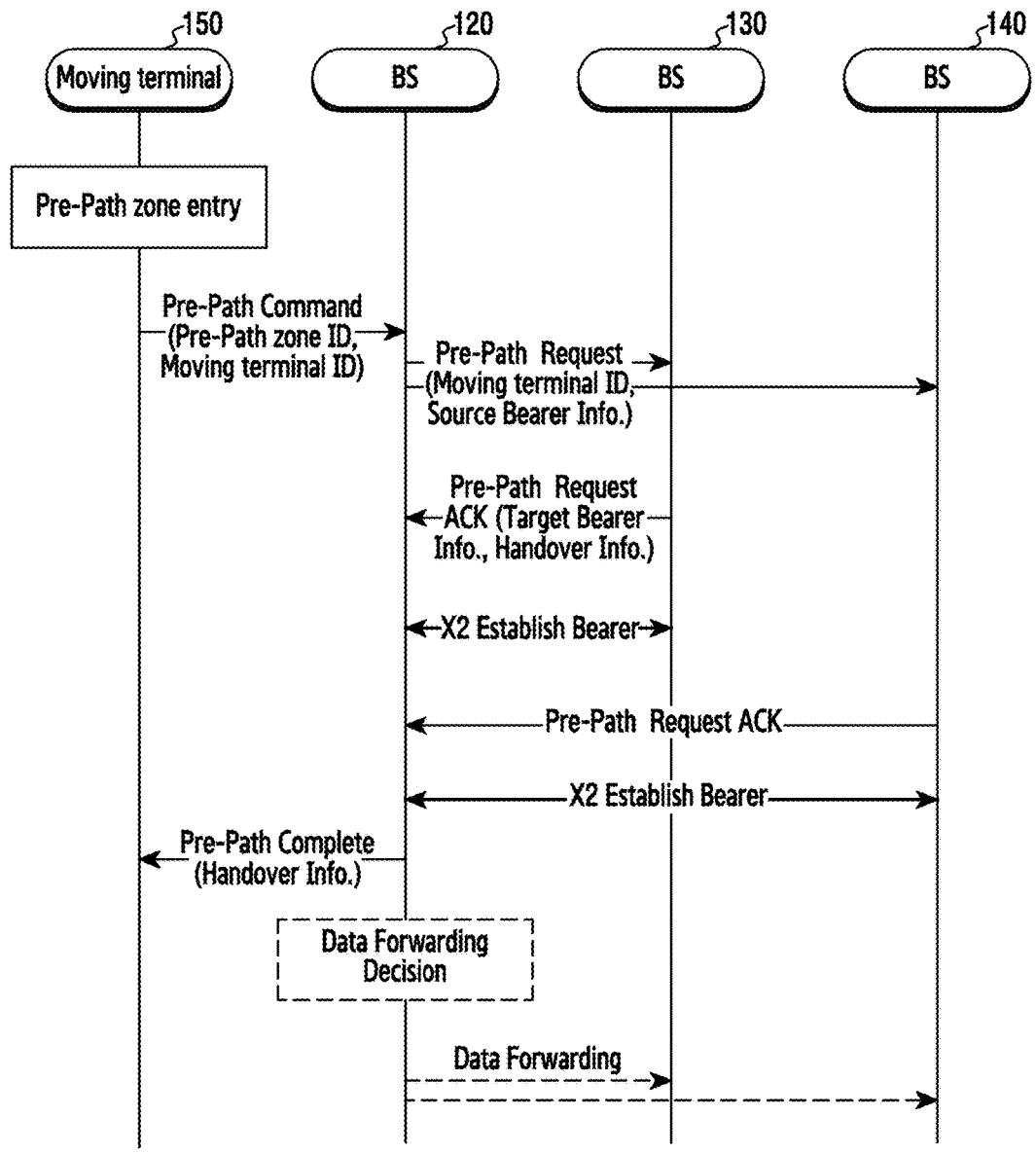
FIG. 12A illustrates a procedure of delivering data by a Base Station (BS) in a pre-path region to other BSs according to an embodiment of the present disclosure.

FIG. 12A illustrates a procedure of delivering data by a BS in a pre-path region to other BSs according to an embodiment of the present disclosure.

Although a procedure of handling a case where the moving terminal 150 enters the pre-path region 301 is illustrated in FIG. 12A for convenience of explanation, the procedure can be handled in the same manner also in a case where the moving terminal 150 enters another pre-path region.

Referring to FIG. 12A, a procedure of handling an operation in which BSs establish a bearer through an X2 interface is illustrated. When the moving terminal 150 enters the pre-path region 301, the moving terminal 150 can transmit a pre-path command message to the BS 120. The pre-path command message can include a pre-path region ID and a terminal ID. Upon receiving the pre-path command message, the BS 120 can transmit a pre-path request message to the BS 130 and the BS 140. The pre-path request message can include a terminal ID and source bearer information (or info). The source bearer info can include information regarding the BS 120. The BS 130 and the BS 140 can transmit a pre-path request ACK message to the BS 120 in response to the pre-path request message. The pre-path request ACK message can include target bearer info and handover info. The target bearer info can include information regarding the BS 130 and the BS 140. If the BS 120 receives the pre-path request ACK message, an X2 bearer can be established among the BS 120, the BS 130, and the BS 140. When the X2 bearer is established among the BSs, the BS 120 can transmit a pre-path complete message to the moving terminal 150. The pre-path complete message can include the handover info. The BS 120 can perform data forwarding to the BS 130 and the BS 140 via the established X2 bearer.

Figure 12B:
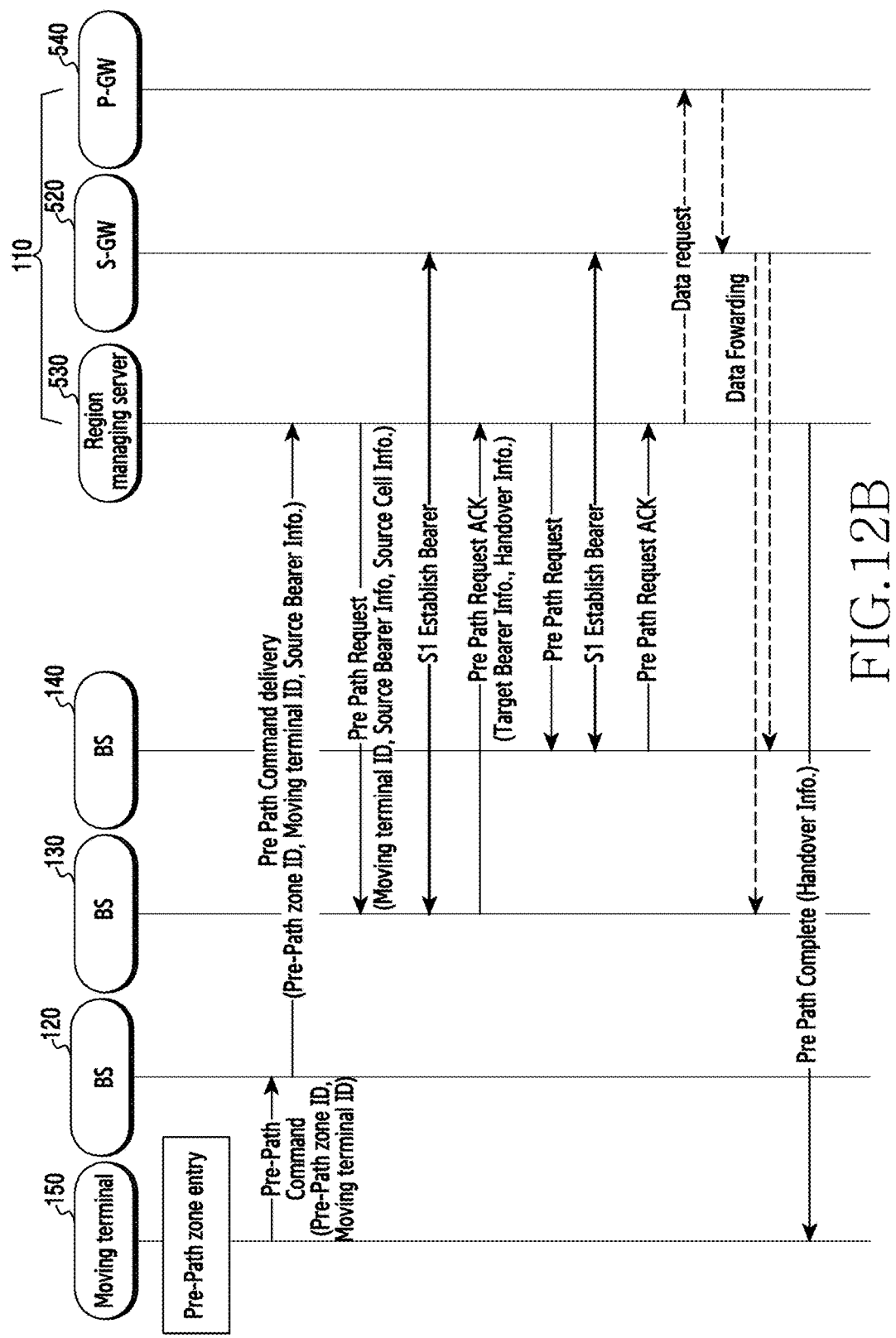
FIG. 12B illustrates a procedure of delivering data by a BS in a pre-path region to other BSs according to another embodiment of the present disclosure.

FIG. 12B illustrates a procedure of delivering data by a BS in a pre-path region to other BSs according to another embodiment of the present disclosure.

Referring to FIG. 12B, a procedure of handling an operation in which BSs establishes a beater through an S1 interface together with the network 110 is illustrated. When the moving terminal 150 enters the pre-path region 301, the moving terminal 150 can transmit a pre-path command message to the BS 120. The pre-path command message can include a pre-path region ID and a terminal ID. Upon receiving the pre-path command message, the BS 120 can deliver the pre-path command message to the region managing server 530 included in the network 110. The delivered pre-path command message can include a pre-path ID, a terminal ID, and source bearer info. Upon receiving the delivered free-path command message, the region managing server 530 can transmit the pre-path request message to the BS 130 and the BS 140. The pre-path request message can include a terminal ID, source bearer info, and source cell info. The BS 130 and the BS 140 can transmit the pre-path request ACK message to the region managing server 530 in response to the pre-path request message. The pre-path request ACK message can include target bearer info and handover info. When the region managing server 530 receives the pre-path request ACK message, an S1 bearer can be established among the S-GW 520, the BS 130, and the BS 140. When the S1 bearer is established, the region managing server 530 can transmit a pre-path complete message to the moving terminal 150. The pre-path complete message can include the handover info. The region managing server 530 can transmit a data request message to the P-GW 540. Upon receiving the data request message, the P-GW 540 can transmit data to the S-GW 520. The S-GW 520 can perform data forwarding to the BS 130 and the BS 140 via the established S1 bearer.

Figure 13:
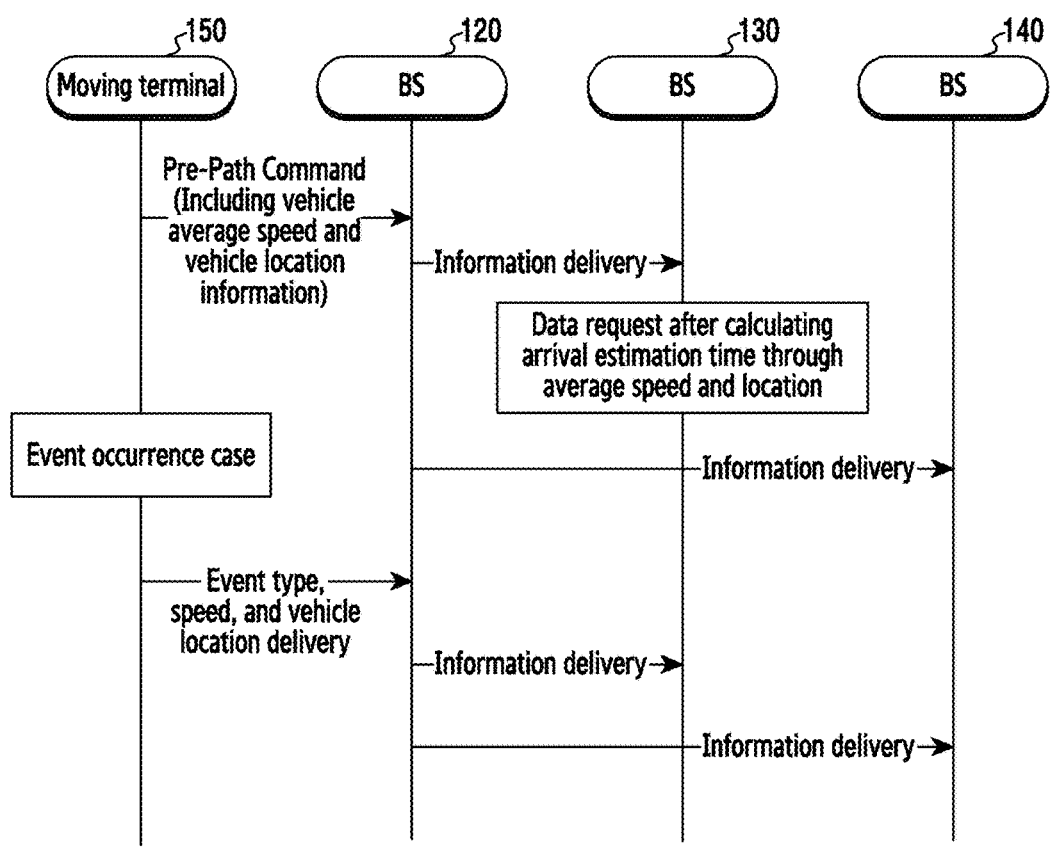
FIG. 13 illustrates a procedure of determining a time at which data is delivered by one BS in a pre-path region to other BSs according to an embodiment of the present disclosure.

FIG. 13 illustrates a procedure of determining a time at which data is delivered by one BS in a pre-path region to other BSs according to an embodiment of the present disclosure.

The moving terminal 150 can transmit a pre-path command message to the BS 120. The pre-path command message can include a vehicle average speed and vehicle location information of the moving terminal 150. Upon receiving the pre-path command message, the BS 120 can deliver the vehicle average speed and vehicle location information of the moving terminal 150 to the BS 130 and the BS 140. The BS 130 and the BS 140 can calculate an arrival estimation time of the moving terminal 150 on the basis of information of the moving terminal 150. The BS 130 and the BS 140 can determine a time at which data is requested to the BS 120 in association with the calculated arrival estimation time. When an event occurs, the moving terminal 150 can transmit information including a type of the event, a speed of the moving terminal 150, and a vehicle location to the BS 120. In one embodiment, the event can be a vehicle accident. Upon receiving information including the type of the event, the speed of the moving terminal 150, and the vehicle location, the BS 120 can deliver the information to the BS 130 and the BS 140.

As illustrated in FIG. 13, according to the aforementioned handling procedure, the BS 130 and the BS 140 can recognize in advance a time at which data is transmitted. The wireless communication system 300 can significantly decrease a network load since an unnecessary data transmission time is decreased.

Figure 14A:
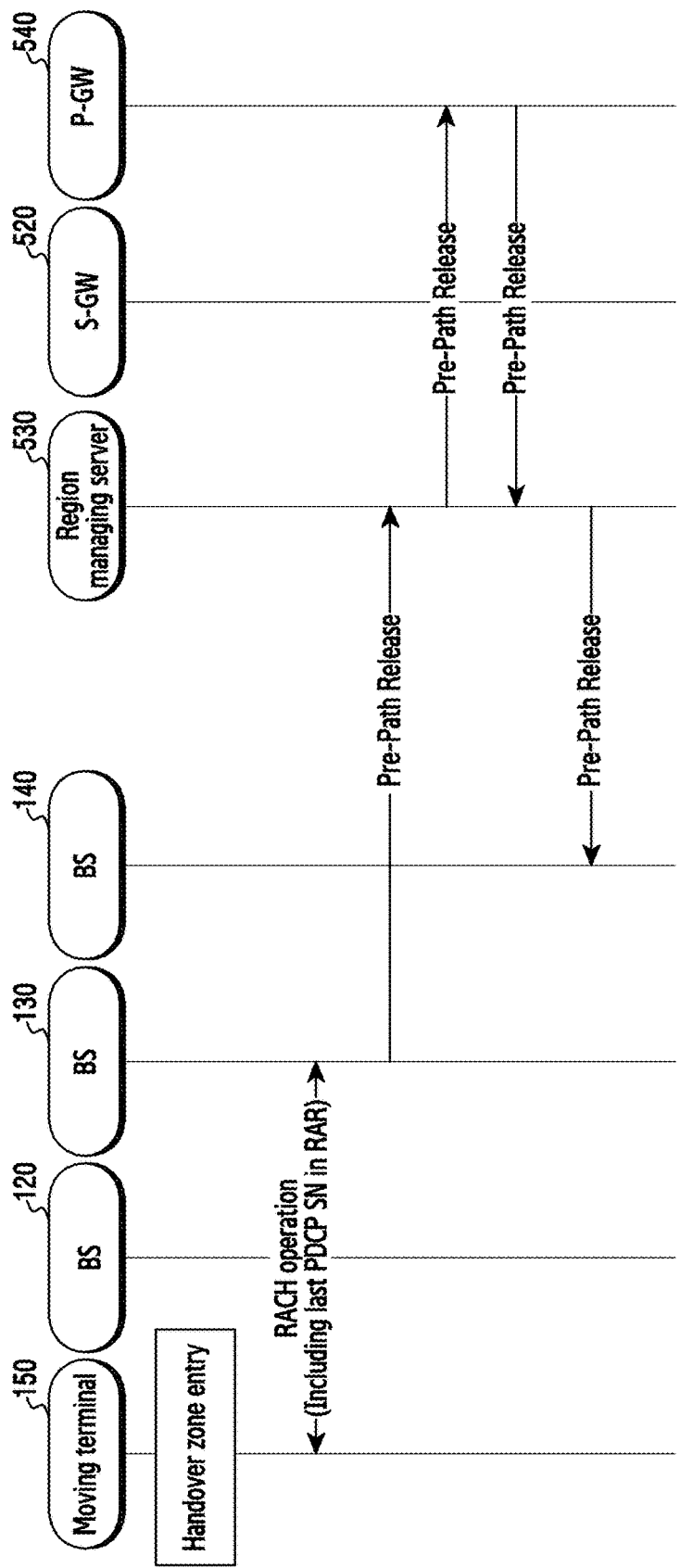
FIG. 14A illustrates a handling procedure when entering a handover region according to an embodiment of the present disclosure.

FIG. 14A illustrates a handling procedure when entering a handover region according to an embodiment of the present disclosure.

Referring to FIG. 14A, a handover handling procedure is illustrated when data forwarding is complete among BSs. When entering the handover region 311, the moving terminal 150 can perform an RACH operation with respect to the BS 130. The RACH operation can include a process in which the moving terminal 150 transmits a random access preamble to the BS 130 and a process in which the BS 130 transmits a Random Access Response (RAR) message to the moving terminal 150. The RAR message can include a last Packet Data Convergence Protocol (PDCP) SN. The last PDCP SN implies a remaining part of vehicle service data received from the network 110 via the BS 120 before the moving terminal 150 executes a handover. When the execution of the handover is complete, the BS 130 can transmit a pre-path release message to the BS 140 via the region managing server 530 and the P-GW 540.

Figure 14B:
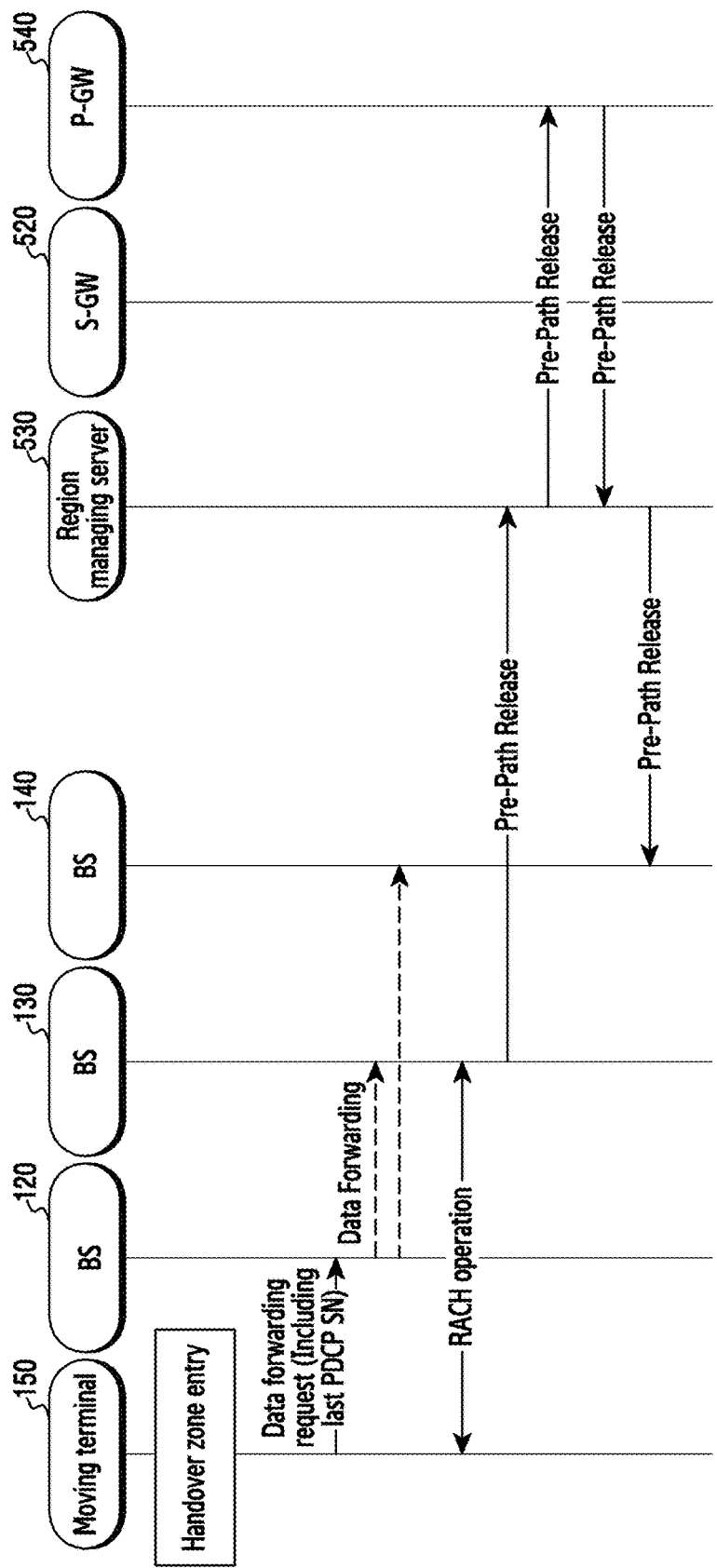
FIG. 14B illustrates a handling procedure when entering a handover region according to another embodiment of the present disclosure.

FIG. 14B illustrates a handling procedure when entering a handover region according to another embodiment of the present disclosure.

Referring to FIG. 14B, a handover handling procedure is illustrated when data forwarding is not complete among BSs. When entering a handover region, the moving terminal 150 can transmit a data forwarding request message to the BS 120. The data forwarding request message can include a last PDCP SN. The BS 120 can perform data forwarding to the BS 130 and the BS 140 in response to the data forwarding request message. When the data forwarding is complete, the BS 130 or the BS 140 can perform the RACH operation with respect to the moving terminal 150. When the execution of the handover is complete, the BS 130 can transmit a pre-path release message to the BS 140 via the region managing server 530 and the P-GW 540.

Figure 15:
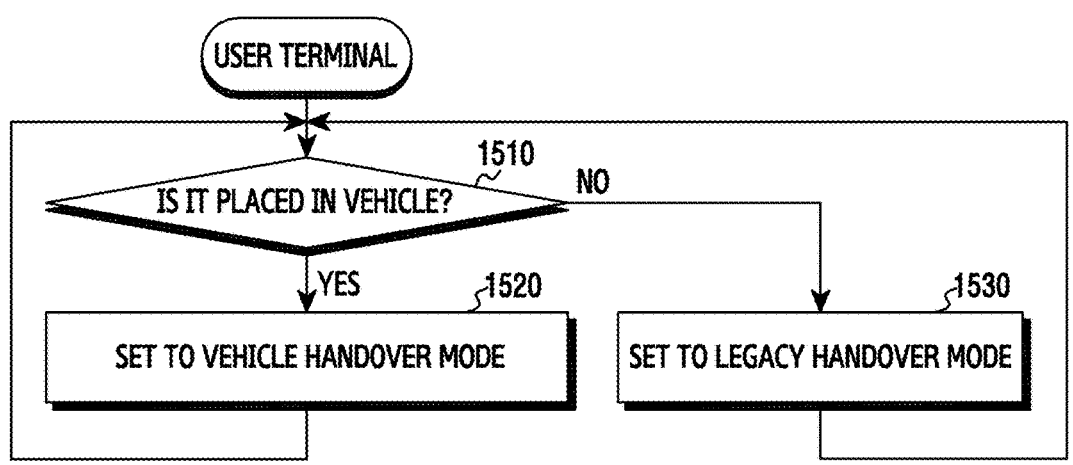
FIG. 15 is a flowchart illustrating a change in a handover operation mode depending on whether a user terminal is placed in a vehicle according to various embodiments of the present disclosure.

FIG. 15 is a flowchart illustrating a change in a handover operation mode depending on whether a user terminal is placed in a vehicle according to various embodiments of the present disclosure.

It can be assumed in the embodiment of FIG. 15 that the moving terminal 150 is a vehicle device. It can be also assumed in the embodiment of FIG. 15 that the user terminal is a terminal of a user who rides in the vehicle device. The user terminal can include two or more terminals. It can be determined whether the user terminal is placed in the vehicle device (step 1510). If the user terminal is placed in the vehicle device, the user terminal is set to a vehicle handover mode (step 1520). In the vehicle handover mode, the user terminal can execute a handover in the same manner as the vehicle device. If the user terminal is not placed in the vehicle device, the user terminal is set to a legacy handover mode (step 1530).

Figure 16:
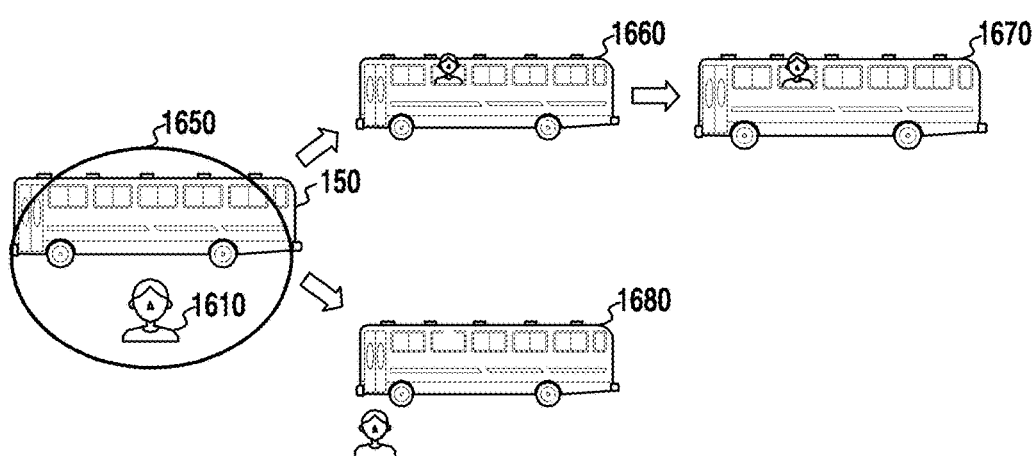
FIG. 16 illustrates an operation of determining whether a user terminal is placed in a vehicle according to an embodiment of the present disclosure.

FIG. 16 illustrates an operation of determining whether a user terminal is placed in a vehicle according to an embodiment of the present disclosure.

It can be assumed in the embodiment of FIG. 16 that the moving terminal 150 is a vehicle device. It can also be assumed in the embodiment of FIG. 16 that a user terminal 1610 is a terminal of a user who rides in the vehicle device.

Referring to FIG. 16, in step 1650, the user terminal 1610 can measure an acceleration or speed of the user terminal 1610 and the moving terminal 150. The user terminal 1610 can directly measure the acceleration or speed of the user terminal 1610 and the moving terminal 150, and can measure it by using BSs communicating with the user terminal 1610 and the moving terminal 150. If the acceleration or speed of the user terminal 1610 is not equal to the acceleration or speed of the moving terminal 150 for a specific time duration, the user terminal 1610 can determine that the user terminal 1610 is not placed in the moving terminal 150 (step 1680). If the acceleration or speed of the user terminal 1610 is equal to the acceleration or speed of the moving terminal 150, the user terminal 1610 can determine that the user terminal 1610 is placed in the moving terminal 150 (step 1660). If the acceleration of the user terminal 1610 and the moving terminal 150 is 0 (i.e., a constant speed) in step 1660, the user terminal 1610 can determine whether it is placed in a vehicle according to whether the user terminal 1610 and the moving terminal 150 have the same speed. If the moving terminal 150 stops in step 1660, the speed of the user terminal 1610 and the moving terminal 150 is 0. If the moving terminal 150 starts to move again, the user terminal 1610 can confirm whether the user terminal 1610 and the moving terminal 150 have the same acceleration for a specific time duration.

Figure 17A:
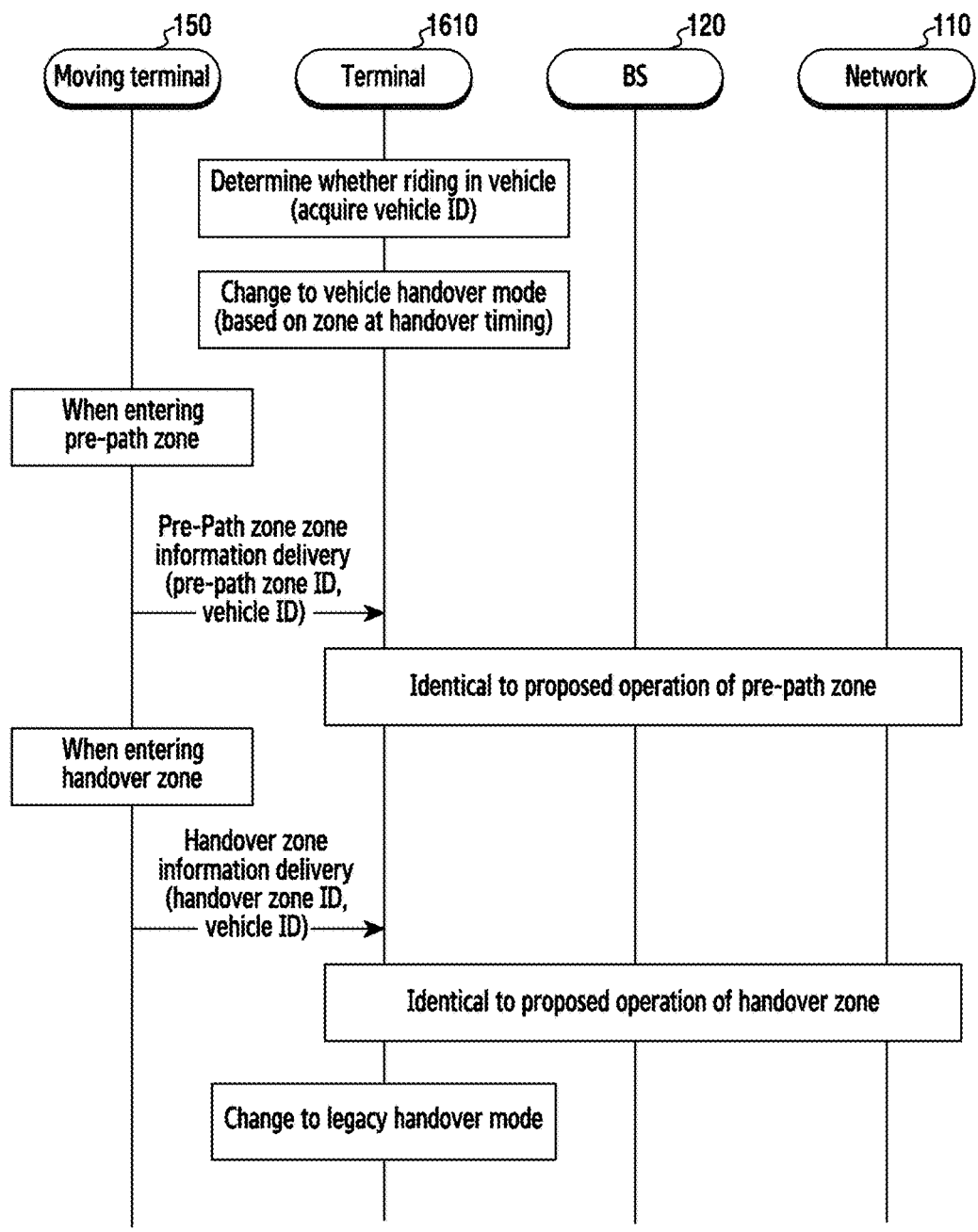
FIG. 17A illustrates a handover handling procedure when a user terminal is placed in a vehicle according to an embodiment of the present disclosure.

FIG. 17A illustrates a handover handling procedure when a user terminal is placed in a vehicle according to an embodiment of the present disclosure.

It can be assumed in the embodiment of FIG. 17A that the moving terminal 150 is a vehicle device. It can also be assumed in the embodiment of FIG. 17A that the user terminal 1610 is a terminal of a user who rides in the moving terminal 150.

Referring to FIG. 17A, it can be determined whether the user terminal 1610 is placed in the moving terminal 150. If the user terminal 1610 is placed in the moving terminal 150, the user terminal 1610 can acquire a vehicle ID of the moving terminal 150. The user terminal 1610 can be set to a vehicle handover mode. The user terminal 1610 can execute a handover on the basis of a region to which it enters when the vehicle handover mode is set. When entering a pre-path region, the moving terminal 150 can deliver pre-path region information to the user terminal 1610. The pre-path region information can include a pre-path region ID and a vehicle ID. Upon receiving the pre-path region information, the user terminal 1610 can perform an operation of establishing a bearer among BSs in the same manner as the moving terminal 150. When entering a handover region, the moving terminal 150 can deliver handover region information to the user terminal 1610. The handover region information can include a handover region ID and a vehicle ID. Upon receiving the handover region information, the user terminal 1610 can execute a handover with respect to the BS in the same manner as the moving terminal 150. If it is determined that the user terminal 1610 is removed from the moving terminal 150, the user terminal 1610 is set to a legacy handover mode. The user terminal 1610 will perform the legacy handover operation.

Figure 17B:
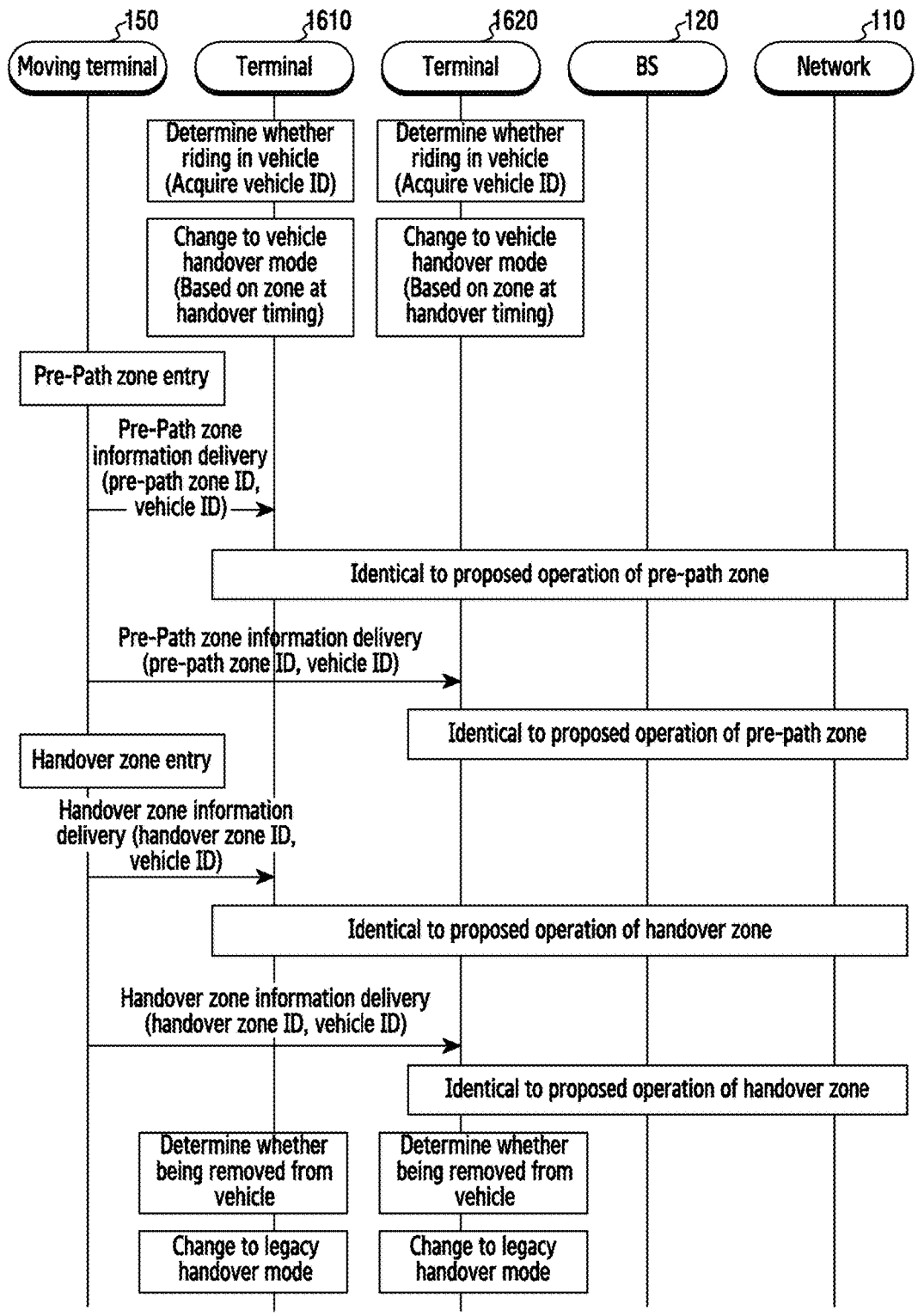
FIG. 17B illustrates a handover handling procedure when a user terminal is placed in a vehicle according to another embodiment of the present disclosure.

FIG. 17B illustrates a handover handling procedure when a user terminal is placed in a vehicle according to another embodiment of the present disclosure.

Referring to FIG. 17B, two or more user terminals can be added in addition to the user terminal 1610. The user terminals can be set to a handover mode according to whether being placed in the moving terminal 150. For example, if the user terminal 1610 is placed in the moving terminal 150 and a user terminal 1620 is not placed in the moving terminal 150, the user terminal 1610 can be set to a vehicle handover mode, and a user terminal 1620 can be set to a legacy handover mode. For another example, if both of the user terminal 1610 and the user terminal 1620 are placed to the moving terminal 150, both of the user terminal 1610 and the user terminal 1620 can be set to the vehicle handover mode.

Figure 18:
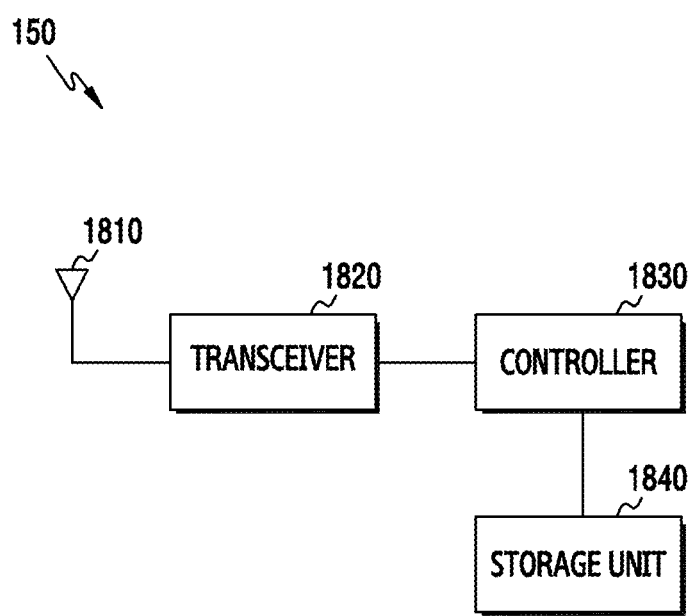
FIG. 18 is a block diagram of a terminal according to various embodiments of the present disclosure.

FIG. 18 is a block diagram of a terminal according to various embodiments of the present disclosure.

Hereinafter, the term ' . . . unit', ' . . . device', or the like implies a unit of processing at least one function or operation, and can be implemented in hardware or software or in combination of the hardware and the software.

Referring to FIG. 18, the moving terminal 150 can include an antenna 1810, a transceiver 1820, a controller 1830, and a storage unit 1840.

The transceiver 1820 performs functions for transmitting/receiving a signal through the antenna 1810. For example, the transceiver 1820 performs a function of conversion between a baseband signal and a bit-stream according to a physical layer standard of a system. For example, in data transmission, the transceiver 1820 generates complex symbols by coding and modulating a transmission bit-stream. Further, in data reception, the transceiver 1820 restores a reception bit-stream by demodulating and decoding a baseband signal. Furthermore, the transceiver 1820 up-converts a baseband signal into a Radio Frequency (RF) signal and thereafter transmits it through an antenna, and down-converts an RF signal received via the antenna into a baseband signal. For example, the transceiver 1820 can include a transmission filter, a reception filter, an amplifier, a mixer, an oscillator, a Digital to Analog Convertor (DAC), an Analog to Digital Convertor (ADC), and the like.

The controller 1830 can control overall operations of the moving terminal 150. For example, the controller 1830 can transmit/receive information via the transceiver 1820. Further, the controller 1830 can record data into the storage unit 1840 and can fetch the data. Furthermore, the controller 1830 can measure the strength of signals of BSs. The controller 1830 can include at least one processor or micro processor, or can be a part of the processor.

The storage unit 1840 can store data such as a basic program, application program, configuration information, or the like for the operation of the moving terminal 150. For example, the storage unit 1840 can store a vehicle service received from the network 110 via the BS 120. Further, the storage unit 1840 can store pre-path region and handover region information received from the network 110 via the BS 120. The storage unit 1840 can consist of a volatile memory, a non-volatile memory, or a combination of the volatile memory and the non-volatile memory.

Figure 19:
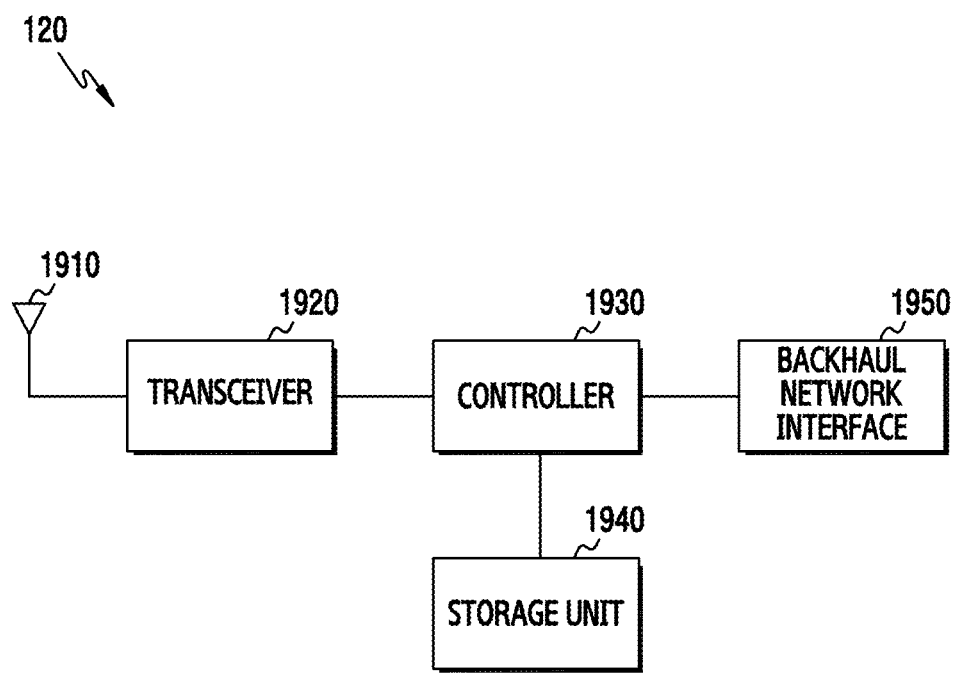
FIG. 19 is a block diagram of a source BS according to various embodiments of the present disclosure.

FIG. 19 is a block diagram of a source BS according to various embodiments of the present disclosure.

In the present disclosure, the BS 120 of FIG. 1 can correspond to the source BS. Referring to FIG. 19, the BS 120 can include an antenna 1910, a transceiver 1920, a controller 1930 a storage unit 1940, and a backhaul network interface 1950.

The transceiver 1920 performs functions for transmitting/receiving a signal through the antenna 1910 from the moving terminal 150 or different BSs. For example, the transceiver 1920 performs a function of conversion between a baseband signal and a bit-stream according to a physical layer standard of a system. For example, in data transmission, the transceiver 1920 generates complex symbols by coding and modulating a transmission bit-stream. Further, in data reception, the transceiver 1920 restores a reception bit-stream by demodulating and decoding a baseband signal. Furthermore, the transceiver 1920 up-converts a baseband signal into a Radio Frequency (RF) signal and thereafter transmits it through an antenna, and down-converts an RF signal received via the antenna into a baseband signal. For example, the transceiver 1920 can include a transmission filter, a reception filter, an amplifier, a mixer, an oscillator, a Digital to Analog Convertor (DAC), an Analog to Digital Convertor (ADC), and the like.

The controller 1930 can control overall operations of the BS 120. For example, the controller 1930 can transmit/receive information via the transceiver 1920. Further, the controller 1930 can record data into the storage unit 1940 and can fetch the data. Furthermore, the controller 1930 can perform an operation of handling a bearer establishment. The controller 1930 can include at least one processor or micro processor, or can be a part of the processor.

The storage unit 1940 can store data such as a basic program, application program, configuration information, or the like for the operation of the BS 120. For example, the storage unit 1940 can store information indicating a pre-path region and a handover region and received from the network 110. The storage unit 1940 can consist of a volatile memory, a non-volatile memory, or a combination of the volatile memory and the non-volatile memory.

The backhaul network interface 1940 can perform communication between the BS 120 and the network 110. For example, the BS 120 can receive information indicating a pre-path region and a handover region from the network 110 via the backhaul network interface 1940.

Figure 20:
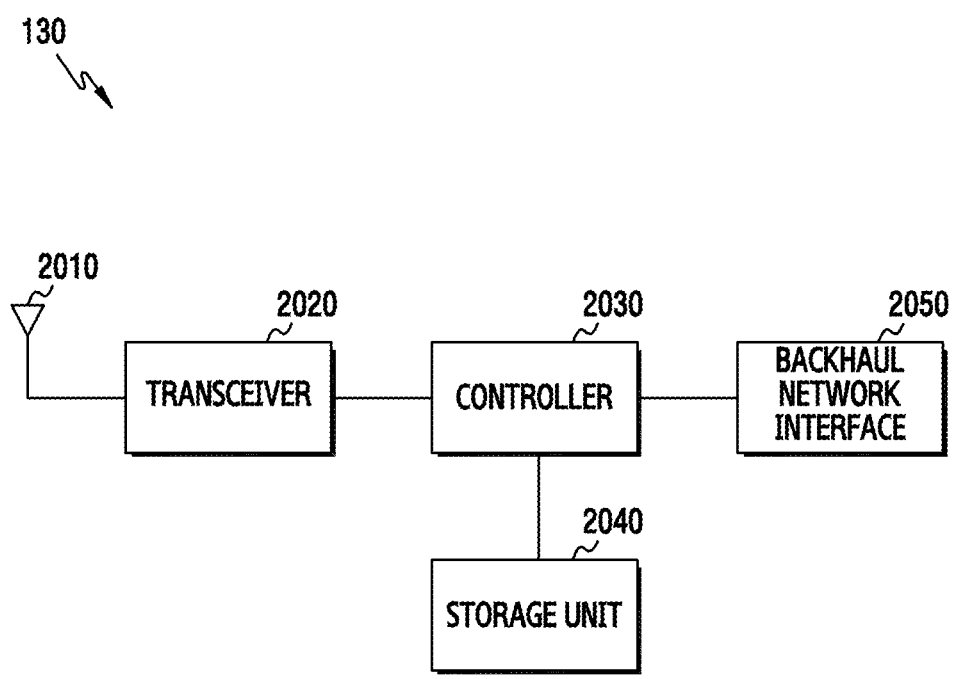
FIG. 20 is a block diagram of a target BS according to various embodiments of the present disclosure.

FIG. 20 is a block diagram of a target BS according to various embodiments of the present disclosure.

In the present disclosure, the BS 130 or BS 140 of FIG. 1 can correspond to the target BS. Referring to FIG. 20, the BS 130 can include an antenna 2010, a transceiver 2020, a controller 2030, a storage unit 2040, and a backhaul network interface 2050.

The transceiver 2020 performs functions for transmitting/receiving a signal through the antenna 2010 from the moving terminal 150 or different BSs. For example, the transceiver 2020 performs a function of conversion between a baseband signal and a bit-stream according to a physical layer standard of a system. For example, in data transmission, the transceiver 2020 generates complex symbols by coding and modulating a transmission bit-stream. Further, in data reception, the transceiver 2020 restores a reception bit-stream by demodulating and decoding a baseband signal. Furthermore, the transceiver 2020 up-converts a baseband signal into a Radio Frequency (RF) signal and thereafter transmits it through an antenna, and down-converts an RF signal received via the antenna into a baseband signal. For example, the transceiver 2020 can include a transmission filter, a reception filter, an amplifier, a mixer, an oscillator, a Digital to Analog Convertor (DAC), an Analog to Digital Convertor (ADC), and the like.

The controller 2030 can control overall operations of the BS 130. For example, the controller 2030 can transmit/receive information via the transceiver 2020. Further, the controller 2030 can record data into the storage unit 2040 and can fetch the data. Furthermore, the controller 2030 can perform an operation of handling a bearer establishment. The controller 2030 can include at least one processor or micro processor, or can be a part of the processor.

The storage unit 2040 can store data such as a basic program, application program, configuration information, or the like for the operation of the BS 130. For example, the storage unit 2040 can store information indicating a pre-path region and a handover region and received from the network 110. The storage unit 2040 can consist of a volatile memory, a non-volatile memory, or a combination of the volatile memory and the non-volatile memory.

The backhaul network interface 2040 can perform communication between the BS 130 and the network 110. For example, the BS 130 can receive information indicating a pre-path region and a handover region from the network 110 via the backhaul network interface 2040.

Figure 21:
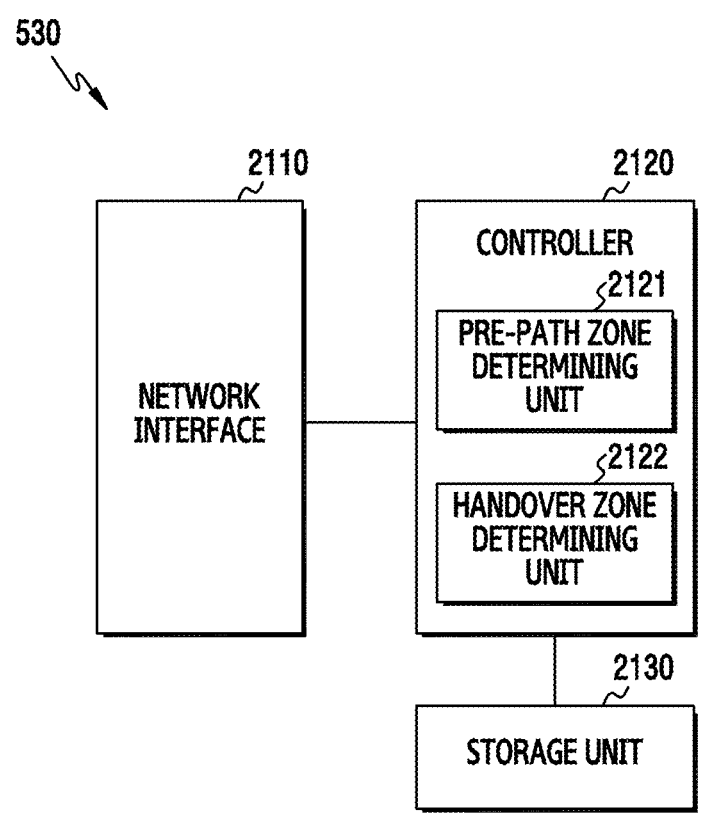
FIG. 21 is a block diagram of a server according to various embodiments of the present disclosure.

FIG. 21 is a block diagram of a server according to various embodiments of the present disclosure.

Referring to FIG. 21, the region managing server 530 can include a network interface 2110, a controller 2120, and a storage unit 2130. The controller 2120 can include a pre-path region determining unit 2121 and a handover region determining unit 2122.

The network interface 2110 can perform communication between the region managing server 530 and different BSs. For example, the region managing server 530 can receive location information of the different BSs via the network interface 2110. Further, the region managing server 530 can transmit information indicating the pre-path region and the handover region via the network interface 2110.

The storage unit 2130 can store data such as a basic program, application program, configuration information, or the like for the operation of the region managing server 530. For example, the storage unit 2130 can store BS location information, measurement result for the strength of signals, and handover point received from the moving terminal 150 via the BS 120.

The controller 2120 can control overall operations of the region managing server 530. For example, the controller 2120 can transmit/receive information via the network interface 2110. Further, the controller 2120 can record data into the storage unit 2130 and can fetch the data. The pre-path region determining unit 2121 can determine the pre-path region on the basis of mobile information of the moving terminal 150. The handover region determining unit 2122 can determine the handover region on the basis of the mobile information of the moving terminal 150.

As described above, embodiments of the present disclosure provide a method of supporting a handover for a high reliability and low latency service in a wireless communication system such as a vehicle communication system.

Although the present disclosure has been described with an exemplary embodiment, various changes and modifications be suggested to one skilled in the art. It is intended that the present disclosure encompass such changes and modifications as fall within the scope of the appended claims.

What is claimed is:

1. A method for operating a terminal, the method comprising:
   receiving, from a first base station (BS), a part of data from a server;
   transmitting, to the first BS, a command message requesting an establishment of a bearer between the first BS and a second BS if detecting that the terminal is located within a pre-path region determined by the server;

performing a handover from the first BS to the second BS if detecting that the terminal is located within a handover region which is a part of the pre-path region; and
receiving, from the second BS, another part of the data,
wherein the another part of the data is transmitted from the first BS to the second BS through the established bearer.

2. The method of claim 1, further comprising receiving information for indicating the pre-path region and the handover region from the server.

3. The method of claim 1,
wherein the pre-path region and the handover region are determined by the server based on movement information of the terminal, and
wherein the movement information of the terminal comprises at least one of information regarding a destination of the terminal, information regarding a departure and the destination, and path information.

4. The method of claim 1, wherein the pre-path region and the handover region are determined, by the server, based on strength of signals and location for each of the first BS and the second BS.

5. The method of claim 4, further comprising:
receiving, from the first BS and the second BS, messages for requesting to measure the strength of signals for each of the first BS and the second BS; and
transmitting, to the server, information regarding the strength of signals for each of the first BS and the second BS.

6. The method of claim 1, wherein the second BS is identified according to the handover region from at least one BS in the pre-path region.

7. A terminal comprising:
a transceiver; and
a controller operatively coupled to the transceiver,
wherein the controller is configured to:
receive, from a first base station (BS), a part of data from a server;
transmit, to the first BS, a command message requesting an establishment of a bearer between the first BS and a second BS if detecting that the terminal is located within a pre-path region determined by the server;
perform a handover from the first BS to the second BS if detecting that the terminal is located within a handover region which is a part of the pre-path region; and
receive, from the second BS, another part of the data,
wherein the another part of the data is transmitted from the first BS to the second BS through the established bearer.

8. The terminal of claim 7,
wherein the controller is configured to receive information for indicating the pre-path region and the handover region from the server.

9. The terminal of claim 7,
wherein the pre-path region and the handover region are determined by the server based on movement information of the terminal, and
wherein the movement information of the terminal comprises at least one of information regarding a destination of the terminal, information regarding a departure and the destination of the terminal, and path information.

10. The terminal of claim 7, wherein the pre-path region and the handover region are determined, by the server, based on strength of signals and location for each of the first BS and the second BS.

11. The terminal of claim 10, wherein the controller is further configured to:
receive, from the first BS and the second BS, messages for requesting to measure the strength of signals for each of the first BS and the second BS; and
transmit, to the server, information regarding the strength of signals for each of the first BS and the second BS.

12. The terminal of claim 7, wherein the second BS is identified according to the handover region from at least one BS in the pre-path region.

13. A first base station (BS) comprising:
a transceiver; and
a controller operatively coupled to the transceiver,
wherein the controller is configured to:
transmit, to a terminal, a part of data from a server;
receive, from the terminal, a command message requesting an establishment of a bearer between the first BS and a second BS if detecting that the terminal is located within a pre-path region determined by the server;
establish a bearer between the first BS and the second BS based on the received command message; and
transmit, to the second BS, another part of the data through the established bearer,
wherein a handover from the first BS to the second BS is performed if the terminal is located within a handover region which is a part of the pre-path region.

14. The first BS of claim 13,
wherein the controller is configured to receive information for indicating the pre-path region and the handover region from the server.

15. The first BS of claim 13,
wherein the pre-path region and the handover region are determined by the server based on movement information of the terminal, and
wherein the movement information of the terminal comprises at least one of information regarding a destination of the terminal, information regarding a departure and the destination, and path information.

16. The first BS of claim 13, wherein the pre-path region and the handover region are determined, by the server, based on strength of signals and location for each of the first BS and the second BS.

17. The first BS of claim 13,
wherein the second BS is identified according to the handover region from at least one BS in the pre-path region.

* * * * *